Feb. 27, 1951 W. D. HOUGHTON 2,543,738

TIME DIVISION PULSE MULTIPLEX SYSTEM

Filed Nov. 15, 1947 9 Sheets-Sheet 1

Fig. A

INVENTOR
WILLIAM D. HOUGHTON
BY Harry Tonnick
ATTORNEY

TIME DIVISION PULSE MULTIPLEX SYSTEM

Filed Nov. 15, 1947 9 Sheets-Sheet 2

INVENTOR
WILLIAM D. HOUGHTON
BY Harry Tunick
ATTORNEY

TIME DIVISION PULSE MULTIPLEX SYSTEM

Filed Nov. 15, 1947 9 Sheets-Sheet 3

INVENTOR
WILLIAM D. HOUGHTON
BY [signature]
ATTORNEY

Feb. 27, 1951 W. D. HOUGHTON 2,543,738

TIME DIVISION PULSE MULTIPLEX SYSTEM

Filed Nov. 15, 1947 9 Sheets-Sheet 4

INVENTOR
WILLIAM D. HOUGHTON
BY Harry Tunick
ATTORNEY

TIME DIVISION PULSE MULTIPLEX SYSTEM

Filed Nov. 15, 1947 9 Sheets-Sheet 5

INVENTOR
WILLIAM D. HOUGHTON
BY [signature]
ATTORNEY

Feb. 27, 1951 W. D. HOUGHTON 2,543,738

TIME DIVISION PULSE MULTIPLEX SYSTEM

Filed Nov. 15, 1947 9 Sheets-Sheet 6

INVENTOR
WILLIAM D. HOUGHTON
BY Harry Tonick
ATTORNEY

Feb. 27, 1951 W. D. HOUGHTON 2,543,738

TIME DIVISION PULSE MULTIPLEX SYSTEM

Filed Nov. 15, 1947 9 Sheets-Sheet 7

INVENTOR
WILLIAM D. HOUGHTON
BY [signature]
ATTORNEY

TIME DIVISION PULSE MULTIPLEX SYSTEM

Filed Nov. 15, 1947 9 Sheets-Sheet 8

INVENTOR
WILLIAM D. HOUGHTON
BY [signature]
ATTORNEY

Feb. 27, 1951 W. D. HOUGHTON 2,543,738

TIME DIVISION PULSE MULTIPLEX SYSTEM

Filed Nov. 15, 1947 9 Sheets-Sheet 9

INVENTOR
WILLIAM D. HOUGHTON
BY [signature]
ATTORNEY

Patented Feb. 27, 1951 2,543,738

UNITED STATES PATENT OFFICE 2,543,738

TIME DIVISION PULSE MULTIPLEX SYSTEM

William D. Houghton, Port Jefferson, N. Y., assignor to Radio Corporation of America, a corporation of Delaware Application November 15, 1947, Serial No. 786,286

21 Claims. (Cl. 179—15)

This invention relates to a multiplex or multichannel system operating on the time division principle, and more particularly, to a pulse multiplex system involving a large number of channels. In a time division multiplex system, a common transmission medium is sequentially assigned to the different channels for non-overlapping time intervals, and each channel has its own modulation applied thereto.

A brief description of the complete system of the invention utilizing transmitting and receiving equipment will now be given.

In the transmitting portion of the equipment, the modulating signals from a number of separate audio inputs are combined into a complex pulse type wave sometimes called a pulse train or video frequency wave. That is, each channel sequentially produces a pulse a characteristic of which is modulated in accordance with the modulating signals applied to the channel. One frame or cycle of operations includes one pulse from each message channel and a synchronizing pulse which has a characteristic distinct from the pulses of the message channels, such as longer duration or higher amplitude, and which allows the receiving equipment to separate it from the channel pulses. The complex pulse type wave is coupled to a radio frequency transmitter which, in turn, feeds a suitable wave radiating structure.

The receiving portion of the equipment includes a radio frequency receiver which is tuned to the frequency of the remotely located radio frequency transmitter and which re-establishes on its video output terminals the complex pulse type wave which is then passed on to the receiving multiplex equipment. The receiving multiplex equipment selects the synchronizing pulse and from it generates a series of gate pulses which make the receiving channel units operate sequentially and at a time when the modulated pulse assigned to the channel is present on its video input terminals. In other words, the complex pulse type wave is coupled to all receiving channels which have their video frequency inputs connected in an electrically parallel fashion, and the channels are made operative one at a time, when the pulse assigned to a particular channel is present on its video input terminals, by means of gate pulses which are controlled by the received synchronizing pulse.

The system herein described utilizes amplitude modulated channel pulses accompanied by a longer duration synchronizing pulse. The synchronizing pulse has an amplitude equal to the peak amplitude of the modulated channel pulses. The radio frequency equipment is of the frequency modulation type. Other types of pulse modulation such as pulse width, pulse numbers or pulse position may be employed, utilizing the timing equipment of this invention, in which case the radio frequency equipment would be of the type most suitable for the type of pulse modulation employed.

More specifically, the system of the invention enables the allotment of time intervals to different channels sequentially and for non-overlapping time intervals by the production of multiple step voltage waves in such a manner that the risers from one step voltage wave occur at a different time than risers in the other step voltage waves and each riser causes one channel in the system to become operative and produce a modulated pulse.

In systems involving a relatively small number of channels (up to 15) a single step voltage wave is sufficient, in which case the number of risers in the step voltage wave is usually made equal to the number of channel units employed. However, when a larger number of channels is involved, a single step voltage wave becomes impractical from the standpoint of stability of operation and design. This invention overcomes these difficulties by producing a number of interlaced step voltage waves so interlaced in time that each riser in the different step voltage waves occurs at a time which is different from and between the times of occurrence of the risers from any other step voltage wave. Each step voltage wave is coupled to a group of channel units, the number of channel units in each group being equal to the number of risers in the applied step voltage wave, and the number of groups being equal to the number of interlaced step voltage waves generated.

A more detailed description of the invention follows in conjunction with drawings wherein.

Figure 3A:
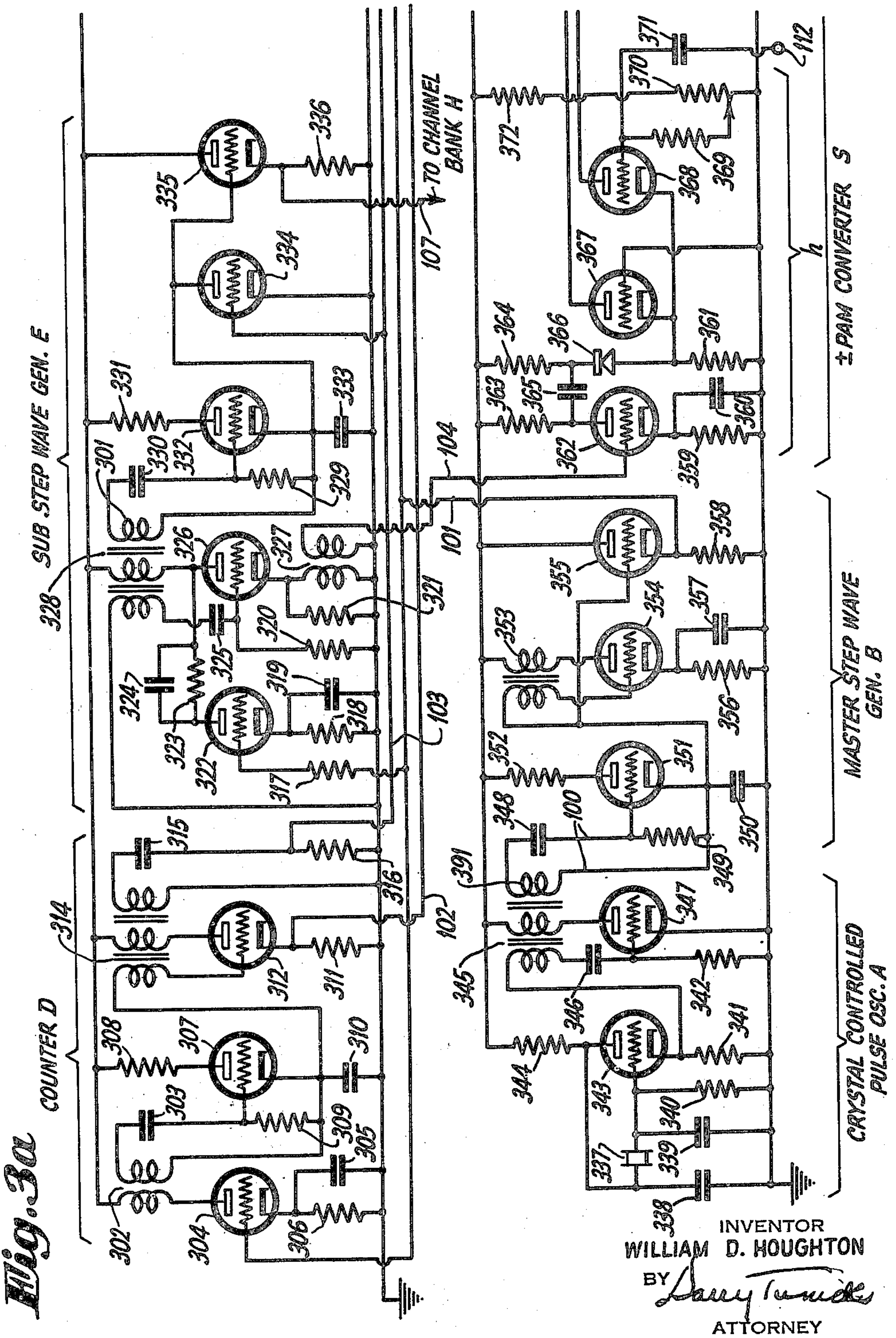
Figure 3B:
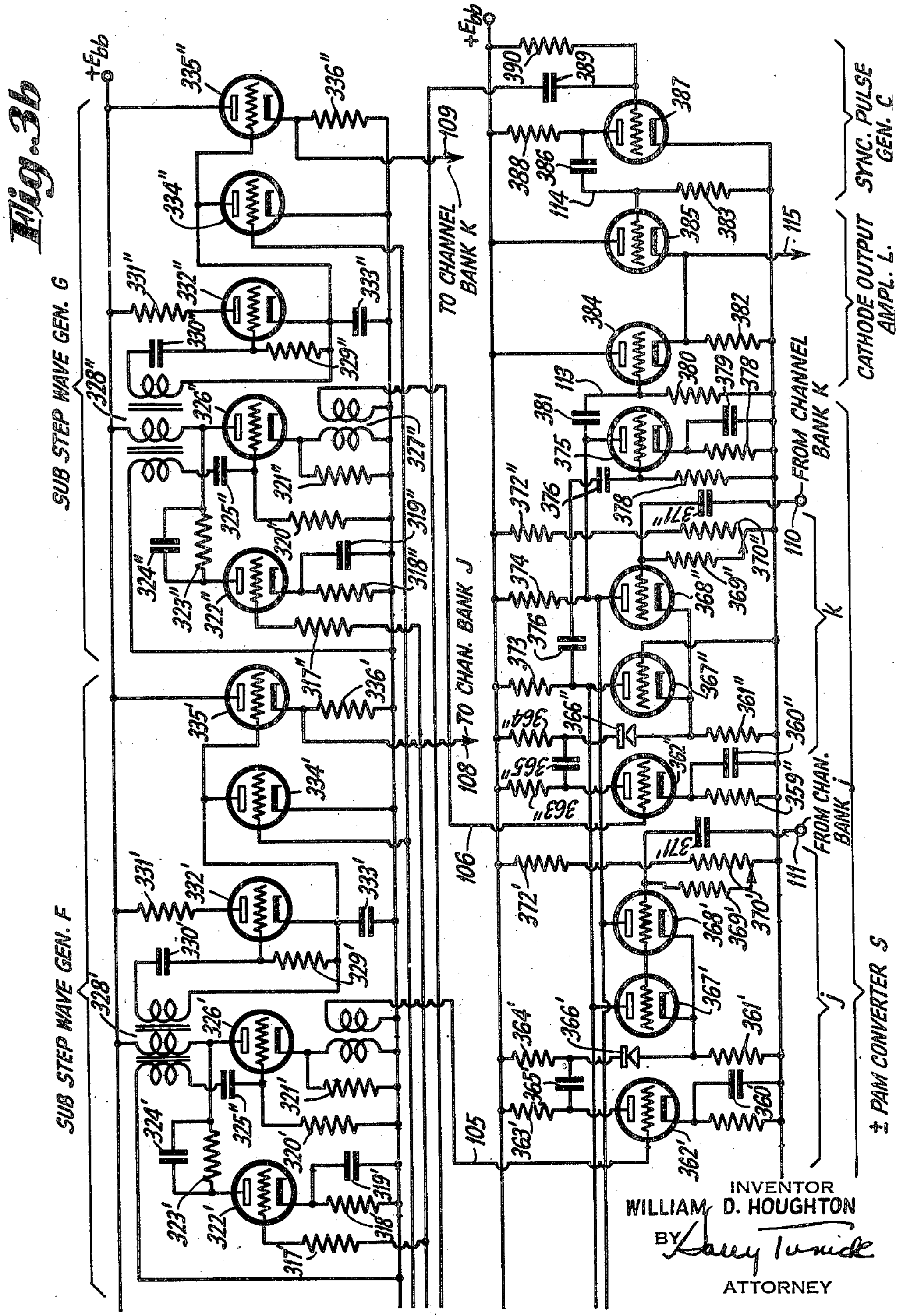

Figs. 3*a* and 3*b* taken together, illustrate, schematically, the cricuit details of the transmitting multiplex common equipment for the plus and minus pulse amplitude time division system.

Figure 4:
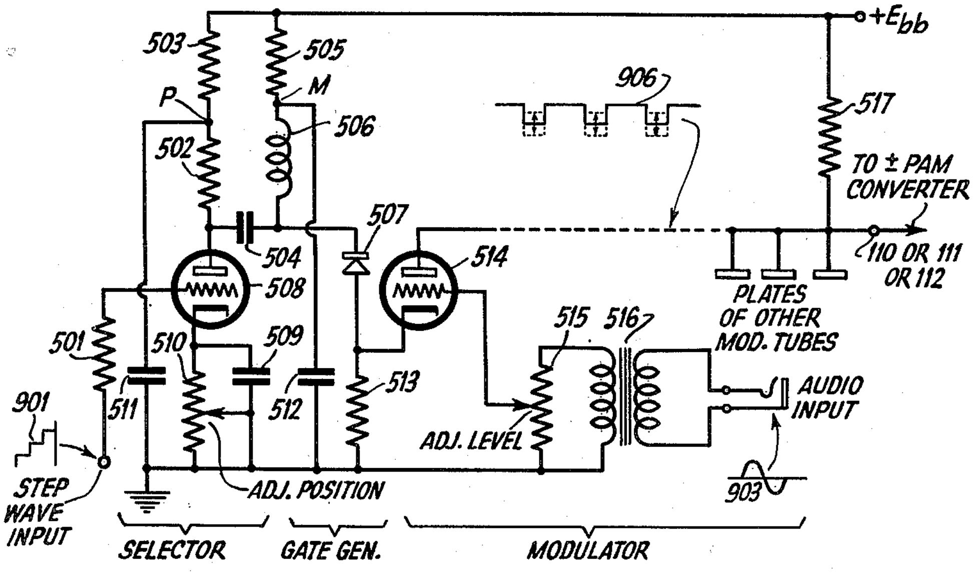

Fig. 4 illustrates, schematically, the circuit details of a transmitting channel unit which may be used with the common equipment of Figs. 3a and 3b.

Figure 5:
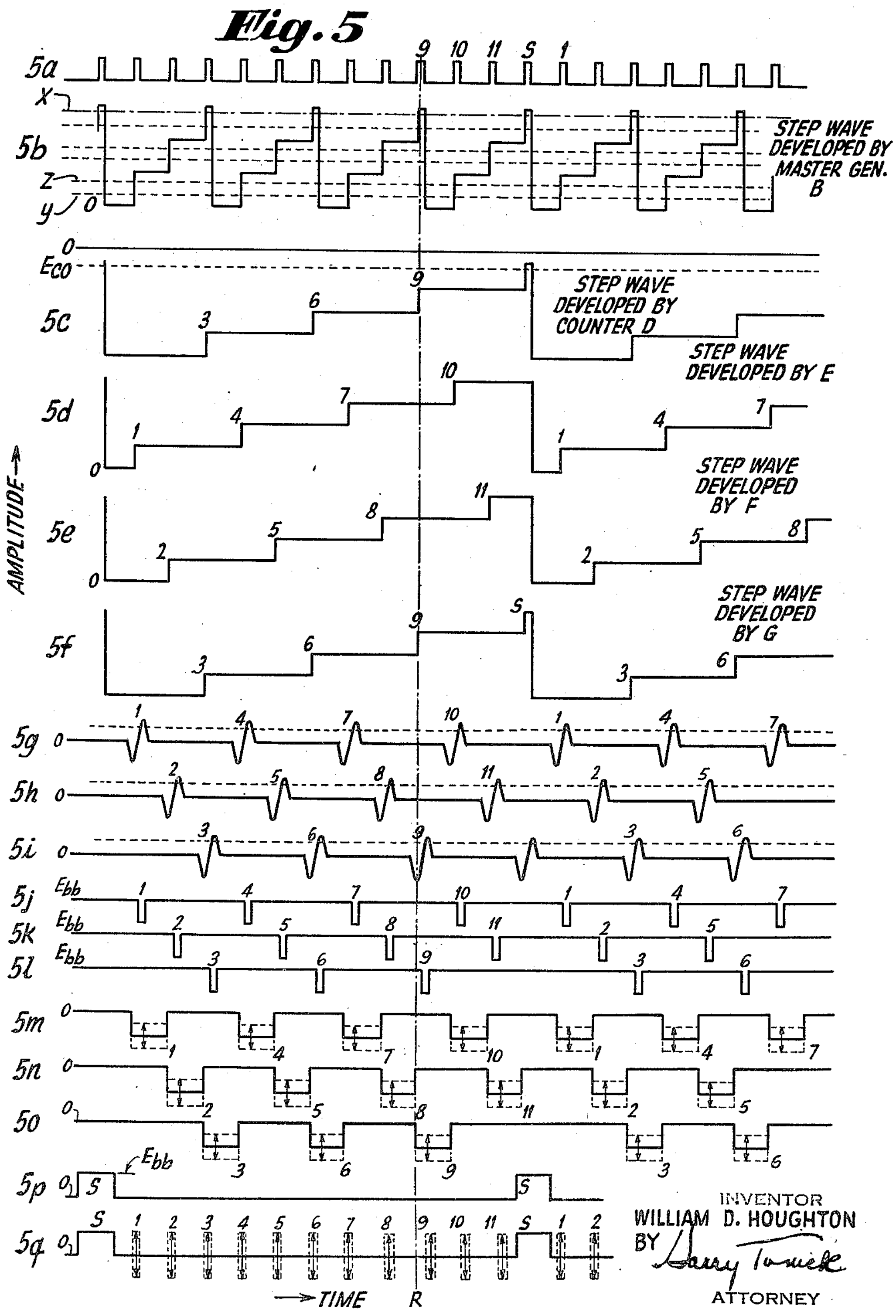

Fig. 5 is a series of waveforms, curves 5a to 5q, graphically illustrating the voltage waveforms at different points of the circuits of Figs. 3a, 3b and 4.

Figure 6A:
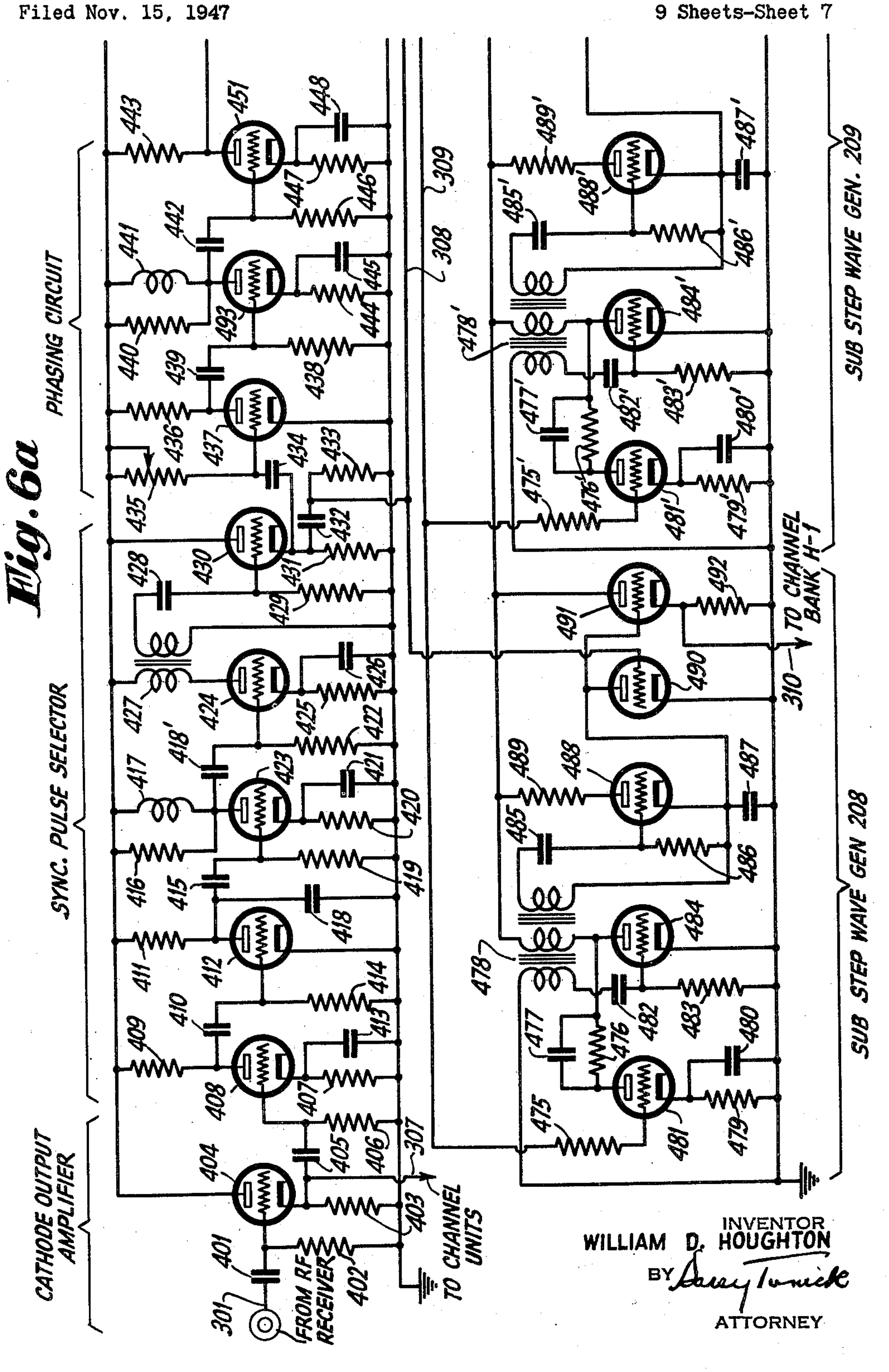
Figure 6B:
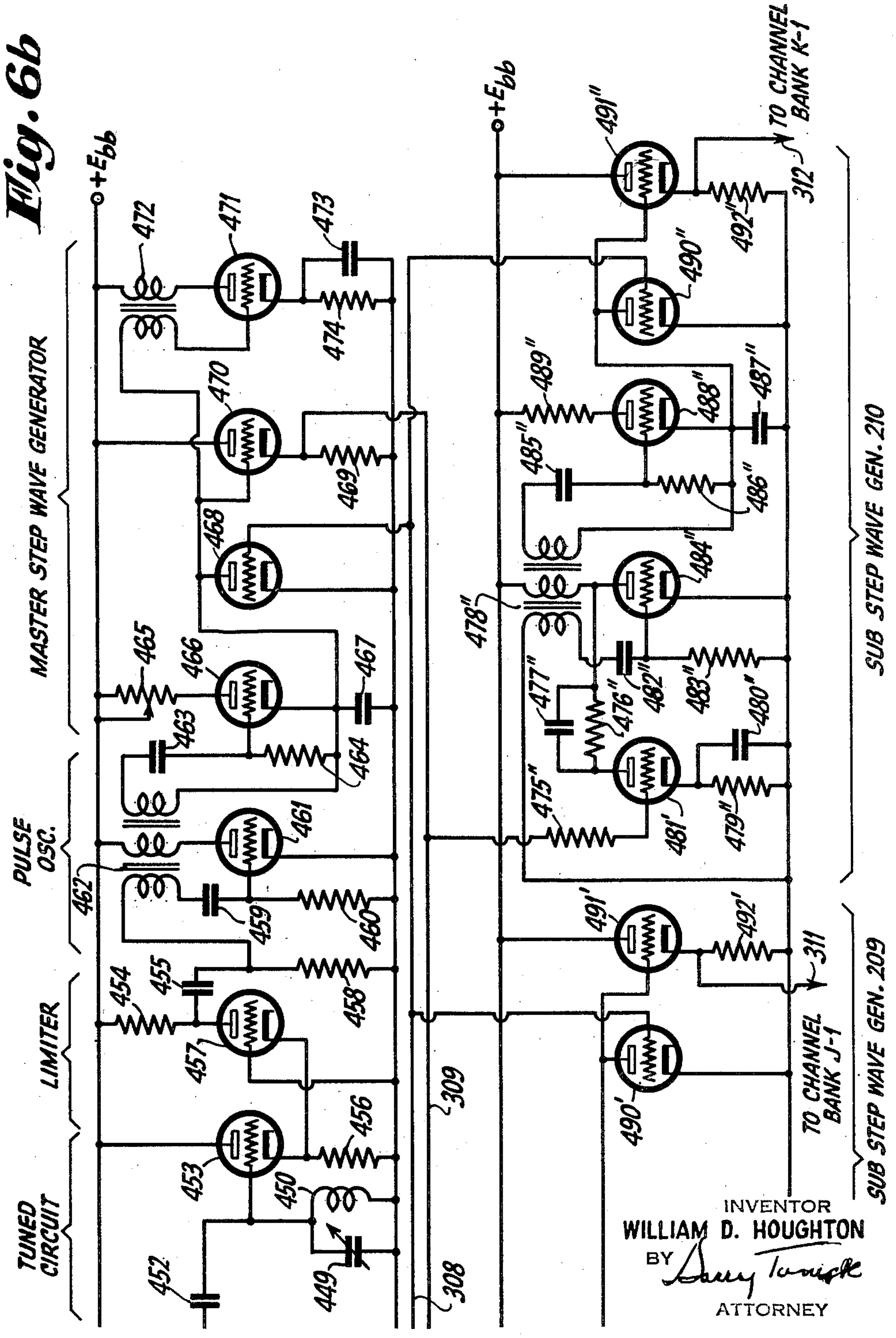

Figs. 6a and 6b taken together, illustrate, schematically, the circuit details of the receiving multiplex common equipment for the plus and minus pulse amplitude modulated time division multiplex system.

Figure 7:
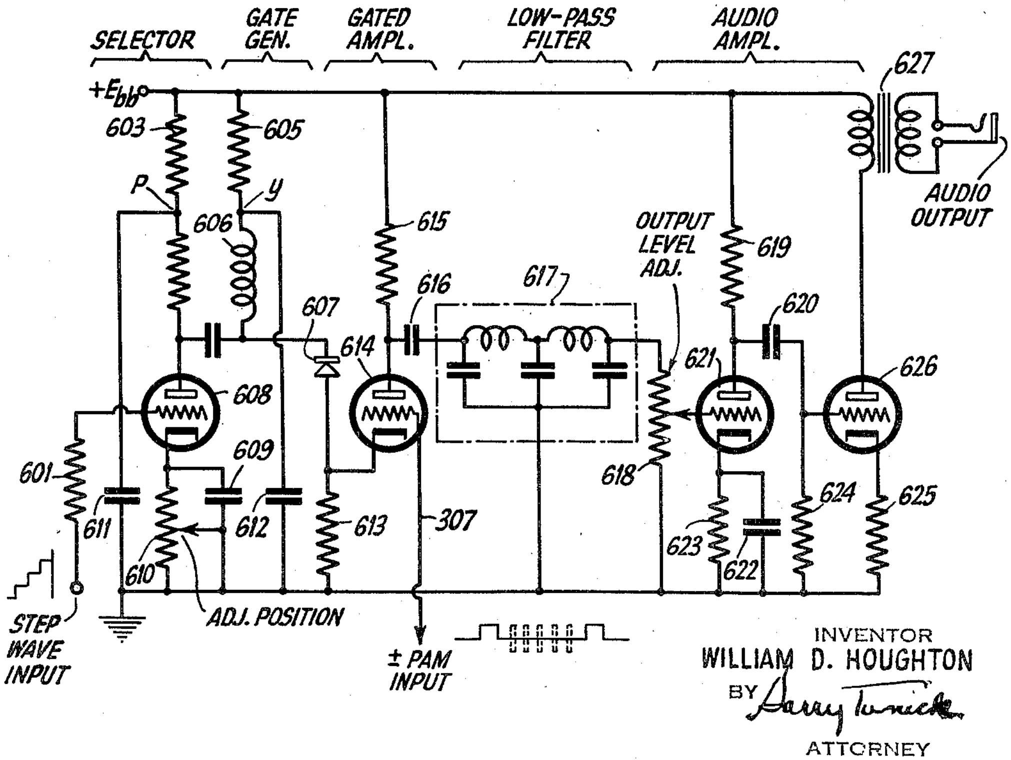

Fig. 7 illustrates, schematically, the circuit details of a receiving multiplex channel unit which may be used with the common equipment of Figs. 6a and 6b.

Figure 8:
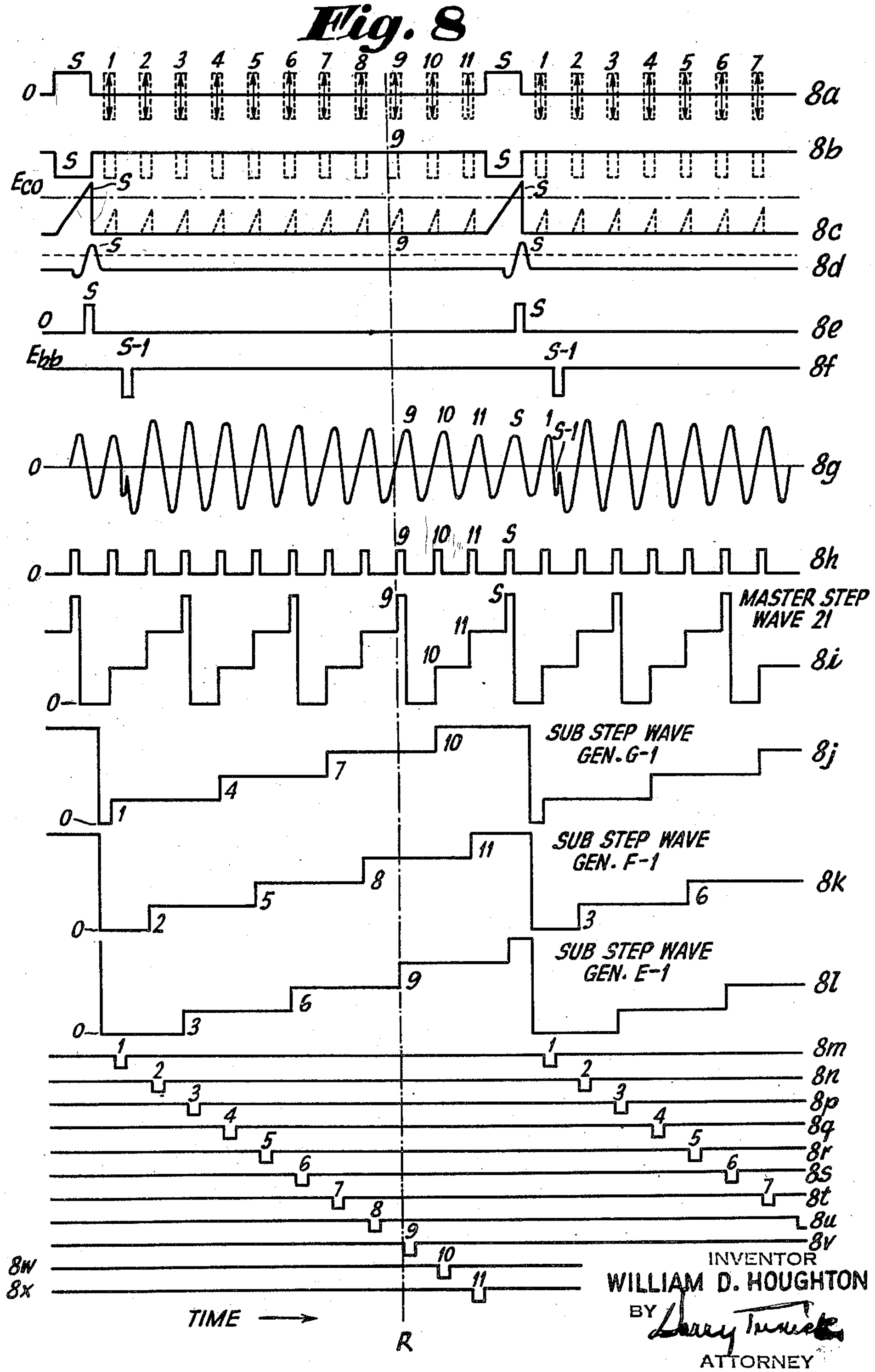

Fig. 8 is a series of waveforms, curves 8a to 8x, graphically illustrating the voltage waveforms at different points of the circuit of Figs. 6a, 6b and 7.

Figure 1:
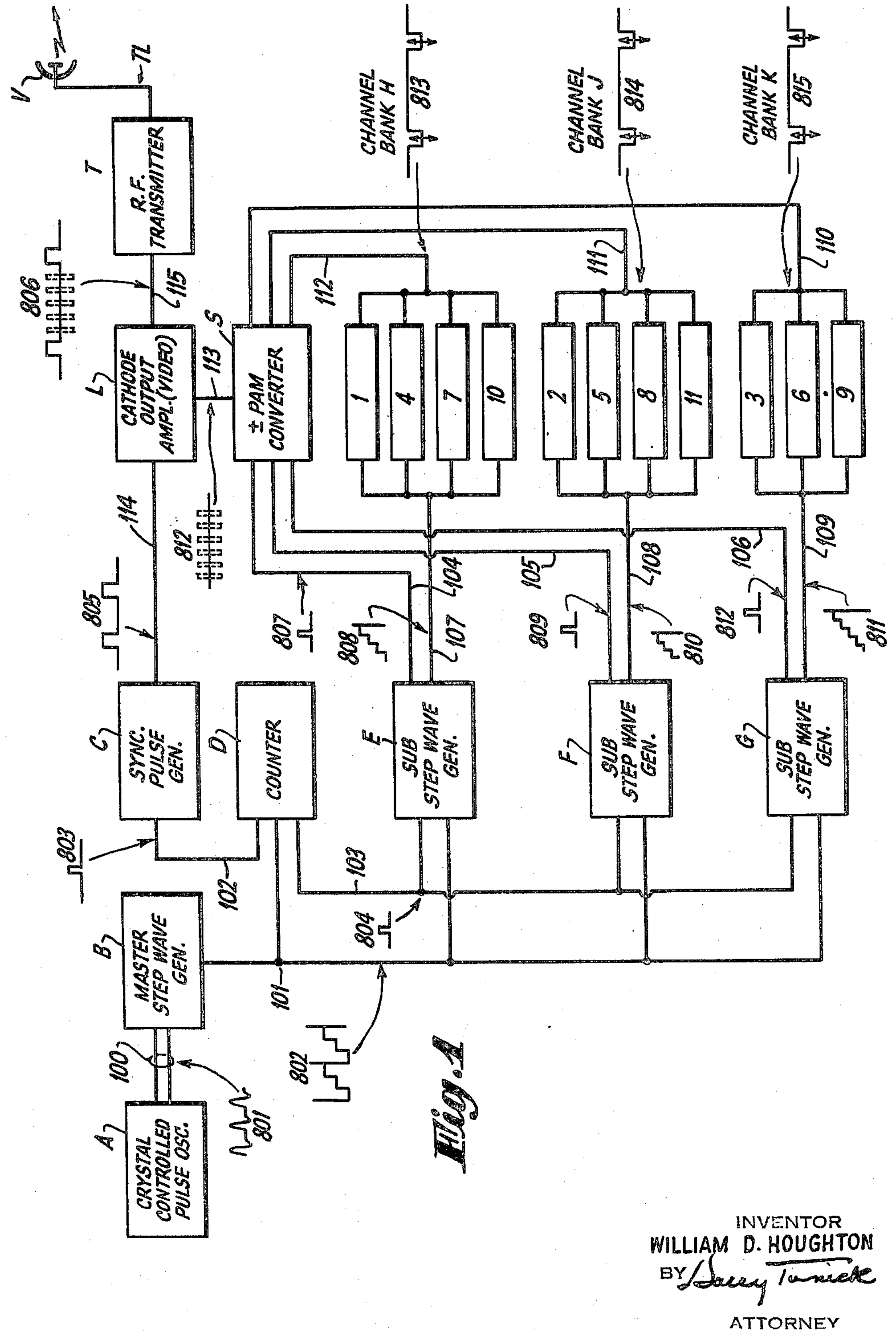
Fig. 1 illustrates, diagrammatically, the transmitting portion of the time division multiplex system of the invention utilizing plus (+) and minus (−) amplitude modulated channel pulses which are applied to a frequency modulated radio frequency transmitter.

Referring to Fig. 1 in more detail, this figure shows the transmitting apparatus for a plurality of channels, each of which is supplied with its own modulating signal.

*General description of transmitter operation*

A crystal controlled pulse oscillator A producing positive pulses as indicated by waveform 801 is employed to drive a master step voltage wave generator B over leads 100. The step voltage wave output from B as indicated by waveform 802 is coupled to counter D and substep voltage wave generators E, F, and G via lead 101.

The counter D counts a predetermined number of stop risers in the step voltage wave output from B and produces positive pulses on its two output leads 102 and 103, as shown in waveforms 803 and 804, respectively, after the predetermined number of top risers have been counted.

Each substep wave generator has two output terminals, on one terminal of which there is produced a step voltage wave and on the other a short positive pulse (short compared to the period of the pulse oscillator A) occurring once for a particular riser in the step voltage wave output from B. That is, each substep wave generator E, F and G contains a selector tube circuit which is biased to become conducting on a particular riser in the step voltage wave output from the master step wave generator B and produces a pulse which causes a riser in the output of the substep wave generator to occur, and after a short time delay a positive pulse is impressed on the other output terminal. The time delay between the time of occurrence of the riser in the step voltage wave output and the occurrence time of the pulse is made short compared to the period of the pulse oscillator A for reasons which will be explained later. The selector tube circuits in the substep wave generators are biased to become operative on different risers in the step voltage wave output from the master step wave generator B. Stated in other words, the step wave outputs from the substep wave generators are interlaced in a manner clearly shown in the curves 5d to 5f of Fig. 5 to be described hereinafter.

The operation of the substep wave generators is explained as follows: On each number 1 riser in the step voltage wave output from the master generator B as indicated by waveform 802, the selector tube circuit in substep wave generator E produces a pulse which in turn produces a riser in its own step voltage wave output on lead 107 as indicated by waveform 808. After a short time, a positive pulse as indicated by waveform 807 is produced on output lead 104. On each number 2 riser in the step voltage wave output of B, the selector tube circuit in substep wave generator F produces a pulse which in turn produces a riser in its own step voltage wave ouput, as indicated by wave form 810, on lead 108. After a short time a positive pulse, as indicated by waveform 809, is produced on lead 105. And on each number 3 riser in the step voltage wave output from the master generator B, the selector tube circuit in substep voltage wave generator G produces a pulse which in turn produces a riser in its own step voltage wave on lead 109, as indicated by wave form 811. After a short time, a positive pulse, as indicated by waveform 812, is produced on lead 106.

The counter D also contains a selector which is biased to become conducting on the last or number 3 riser from the step wave voltage output from master generator B and which after a predetermined number of last or number 3 risers from the step wave outputs from B causes a positive pulse as indicated by waveform 804 to be developed on lead 103. This pulse discharges all substep wave generators simultaneously. At the time of occurrence of the pulse 804 on lead 103, another pulse as indicated by waveform 803, is produced on lead 102 by counter D. This pulse causes the synchronizing pulse generator C to produce a synchronizing pulse on lead 114 which is of longer duration than the final channel pulses.

The pulse outputs from substep wave generators E, F, and G are coupled to the plus and minus PAM converter S by means of leads 104, 105 and 106, respectively, and the step voltage wave outputs from these substep wave generators are coupled to channel banks H, J, and K via leads 107, 108, and 109, respectively. Each channel bank includes a plurality of channel units.

Each transmitting channel unit consists of a position selector, a gate generator, and a pulse modulator. The channel position selectors are differently biased to become operative on different risers of the applied step voltage wave from the associated substep wave generator, and each drives a gate generator which produces a gate pulse which allows the pulse modulator to produce a negative, amplitude modulate pulse on an output lead common to all channel modulator tubes in the channel bank. The output from each bank of channel units consists of a series of negative, amplitude modulated, sequentially occurring pulses which are coupled to the plus and minus PAM converter unit S. Thus the output pulses from channel bank H (which comprises four channel units 1, 4, 7 and 10) are coupled to PAM converter S by way of lead 112; the output pulses from channel bank J (which comprises four channel units 2, 5, 8 and 11) are coupled to converter S by way of lead 111; and the output pulses from channel bank K (which comprises three channel units 3, 6, and 9) are coupled to converter S by way of lead 110.

The plus and minum PAM converter unit S converts the relatively longer duration and negative amplitude modulated channel pulses on leads 110, 111 and 112 to positive and negative shorter duration amplitude modulated pulses with a duration equal to the duration of the pulses applied on leads 104, 105 and 106. The pulses in leads 110, 111 and 112 are diagrammatically illustrated by waveforms 815, 814 and 813, respectively. The double arrows on these waveforms indicate amplitude variations. The output of the plus and minus PAM converter S consists of a series of pulses, the amplitude and polarity of which are a function of the instantaneous amplitude and polarity of the modulating signal applied to the channel at the occurrence time of the pulse. If the modulating signal has zero amplitude at the time the channel produces a pulse, then there will be no output pulse from the PAM converter S for that channel. In other words, the pulse produced by converter S for a channel unit having no modulation applied thereto will have zero amplitude.

The output from the PAM converter S as indicated by waveform 812 is coupled to one input of a video amplifier L via lead 113, and the synchronizing pulse as indicated by waveform 805 is coupled to another input of video amplifier L via lead 114. The output of the amplifier L consists of a train of channel pulses followed by a longer duration synchronizing pulse as shown in waveform 806 and is coupled to the frequency modulation transmitter T via lead 115. Each pulse causes the frequency of the transmitter T to be deviated by an amount proportional to the amplitude of the applied pulses. Stated otherwise, the converter S converts the negative going amplitude modulated pulses received by it over leads 110, 111 and 112 to plus and minus amplitude modulated pulses and feeds these last pulses to the common video amplifier L. The dashed line pulses in waveform 806 and 812 indicate the maximum positive and negative amplitudes which the channel pulses may attain on the extremes of modulation. The radio frequency output from the transmitter T is coupled to a suitable radiating element V via transmission line TL.

*General description of receiver operation*

Figure 2:
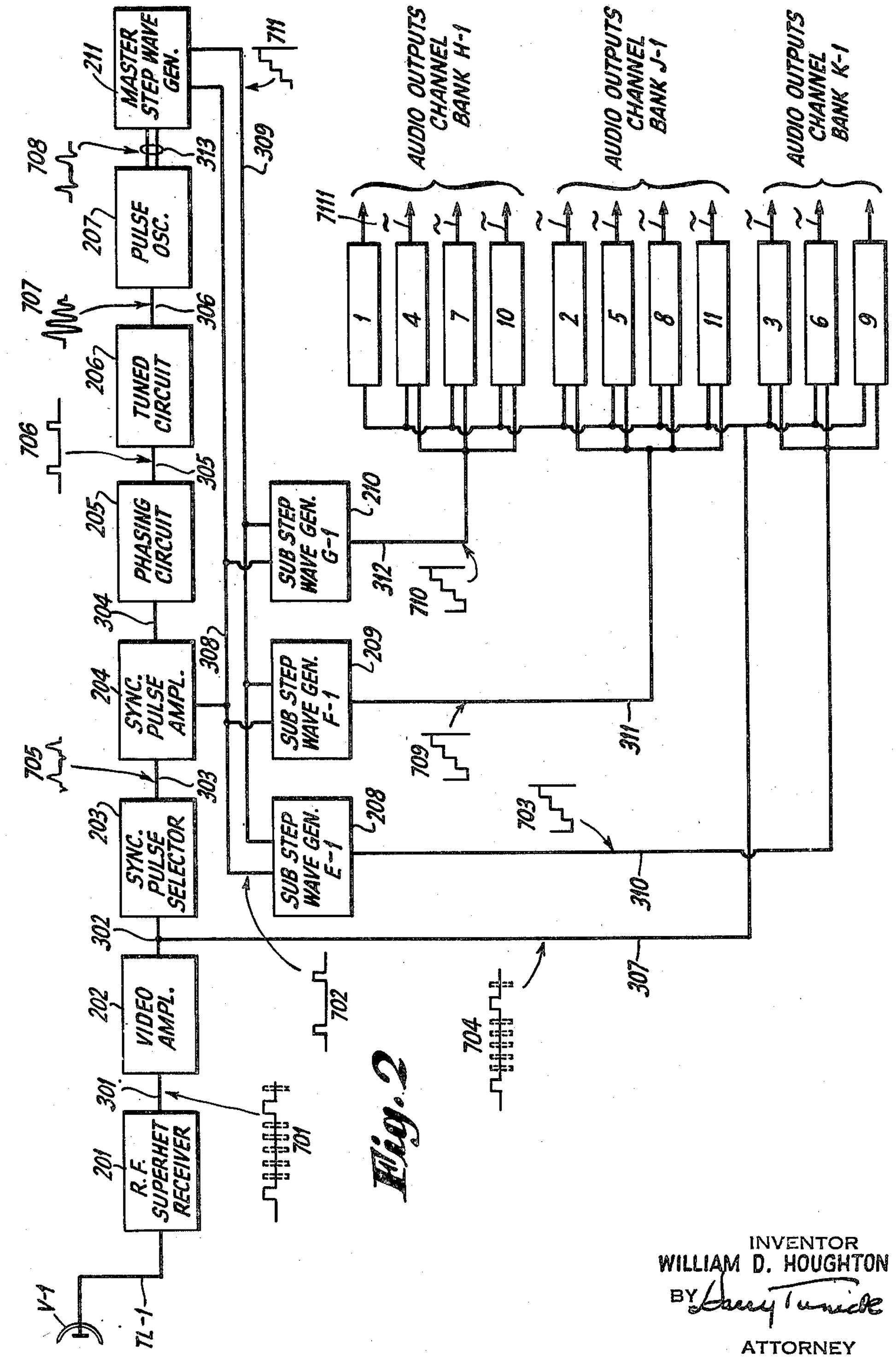
Fig. 2 illustrates, diagrammatically, the receiving portion of the system.

Referring to Fig. 2, which shows diagrammatically the receiving multiplex equipment, the radio frequency waves are picked up on antenna V—1 and are coupled to a radio frequency superheterodyne receiver 201 via transmission line TL—1. The radio frequency receiver demodulates the frequency modulated radio frequency signals and re-establishes on its video output terminals the pulse train as shown in waveform 701. The output of receiver 201 is coupled to a video amplifier 202 via lead 301. The output from the video amplifier as indicated by waveform 704 is coupled via lead 307 to all receiving channel units in the various channel banks which have one of their inputs connected in an electrically parallel manner. The output from the video amplifier 202 is also coupled to a synchronizing pulse selector 203 via lead 302. The synchronizing pulse selector 203 selects or separates the synchronizing pulse from the channel pulses by virtue of the longer duration of the synchronizing pulse and produces a pulse which occurs once for each received longer duration synchronizing pulse as shown by waveform 705. The output from the synchronizing pulse selector 203 is coupled to a synchronizing pulse amplifier 204 via lead 303. The synchronizing pulse amplifier has two outputs, one of which is connected to a phasing circuit 205 via lead 304 and the other to a master step wave generator 211 and substep wave generators 208, 209 and 210 via lead 308. The synchronizing pulse output appearing in lead 308 is shown by waveform 702.

The phasing circuit 205 produces a pulse whose occurrence time is made to be manually adjustable. That is, the occurrence time of the pulse produced by the phasing circuit 205 lags the selected synchronizing pulse by a time interval which is manualy adjustable to compensate for time delays in the circuits of the receiving equipment. Of course, this adjustment could be made automatic with some complication of the receiving equipment.

The positive pulses from the phasing circuit 205 as indicated by waveform 106 are coupled to a tuned circuit 206 which produces a slightly damped sine wave of a frequency equal to that of the crystal in the transmitting multiplex equipment. This damped wave as indicated by waveform 707 is coupled to and locks in a pulse oscillator 207, resulting in the production of pulses with a repetition rate equal to the repetition rate of the pulses produced by the pulse oscillator A in the transmitting multiplex equipment (Fig. 1).

The positive pulses from the pulse oscillator 207 as indicated by waveform 708 are coupled via lead 313 to a master step wave generator 211 which produces on its output terminals a step voltage wave as indicated by waveform 711.

The step wave output from the master step wave generator is coupled via lead 309 to three substep wave generators 208, 209, and 210, which produce step waves on different risers of the step wave output from 211 in a manner similar to that described for the substep wave generators E, F and G in the transmitting equipment.

The step voltage wave outputs from the substep wave generators 210, 209, and 208 are coupled to three banks of channel units H—1, J—1, and K—1 via leads 312, 311, and 310 respectively. Channel banks H—1, J—1 and K—1 correspond to channel banks H, J, and K at the transmitter, Fig. 1. The respective step voltage wave outputs from substep wave generators 208, 209 and 210 are represented by waveforms 703, 709 and 710.

Each receiving channel unit in each bank includes a channel position selector, a gate generator, a low pass filter, and an audio amplifier. The channel position selectors are differently biased, in a manner similar to that described for the transmitting channel selectors, to become operative on different risers of the applied step waves. When a channel position selector becomes operative, it causes a gate generator to produce a pulse which renders an amplifier tube operative, thus allowing it to pass the desired pulse. The length of the gate, and hence the length of time during which the amplifier tube is made operative is made equal to the duration of the video channel pulses. The channel pulse thus selected is coupled to a low pass filter which attenuates the pulse frequencies and allows the modulating frequencies to pass. The output from the low pass filter is coupled to an audio amplifier which amplifies the audio frequency signals and couples them to the output terminals. The waveform of the modulating frequencies in the outputs of the channel units is represented by waveform 7111.

*Details of transmitter*

In the schematic illustration of Figs. 3*a* and 3*b*, the circuits which correspond with the circuits of Fig. 1 have been given the same reference letters. The crystal controlled pulse oscillator A comprises two sections, one a crystal oscillator section, and the other a pulse oscillator section. The crystal oscillator section consists of a normally non-conducting vacuum tube 343, a piezo-electric crystal 337, condensers 338 and 339 and resistors 340, 341 and 344. The pulse oscillator section includes a normally non-conducting tube 347, a pulse transformer 345, condenser 346, and resistors 341 and 342.

The operation of these circuits is as follows: Crystal 337 together with condensers 338 and 339 form the oscillatory circuit with condensers 338 and 339 acting as a voltage divider to provide the proper relationship between the anode and grid voltages. On each positive peak of the sine wave across condenser 339, tube 343 draws current, resulting in a positive voltage pulse being developed across resistor 341 and a pulse of current applied to the oscillator circuit sufficient to maintain oscillations. The positive pulses thus developed across resistor 341 are used to lock in the pulse oscillator.

The pulse type transformer 345 in the anode circuit of normally non-conducting tube 347 is so poled that as the anode current in vacuum tube 347 increases, the voltage applied to the grid increases, resulting in a further increase in anode current. This action continues until the anode current in tube 347 reaches a maximum, at which time there is no further increase in grid voltage. Hence the voltage on the grid starts to decrease, resulting in a reversal of the above events, until tube 347 is completely cut-off. Tube 347 remains cut-off due to a voltage developed across resistor 342 due to condenser 346 discharging. Condenser 346 is charged by means of grid current during the pulse time. The values of condenser 346 and resistor 342 are so chosen that tube 347 is nearly ready to conduct at the occurrence time of the positive pulse across resistor 341 due to the action of the crystal oscillator. This positive pulse causes tube 347 to start to conduct and the above described action takes place. In other words, the frequency of the pulse oscillator is set to be slightly lower than the frequency of the crystal and therefore each pulse across 341 developed by the crystal circuit trips the pulse oscillator and causes it to produce a pulse. It will thus be noted that the pulse oscillator section of A can be considered as a transformer feedback blocking oscillator controlled by voltage pulses developed across resistor 341.

The operation of the master step wave generator B, which includes normally non-conducting vacuum tubes 351 and 354, normally conducting tube 355, pulse type transformer 353, resistors 349, 352, 356 and 358 and condensers 348, 350 and 357 is as follows: The winding 391 of pulse transformer 345 is so poled that each time the pulse oscillator produces a pulse, a positive pulse is applied between the grid and cathode of tube 351 causing it to conduct and draw grid current, charging condenser 348. After the pulse from the pulse oscillator ceases, tube 351 cuts-off and remains cut-off due to grid leak bias developed across resistor 349. Each time tube 351 conducts, an incremental charge is stored in condenser 350, resulting in a step of voltage being developed there-across. The magnitude of the incremental charge and hence the magnitude of the incremental changes in voltage across condenser 350 is a function of the duration of the pulse from pulse oscillator A, the impedance offered by tube 351 and the values of resistor 352 and condenser 350. Since the pulse length and the impedance offered by tube 351 remain constant, the values of condenser 350 and resistor 352 may be chosen such that a desired amplitude of incremental voltage change across 350 for each pulse from pulse oscillator A, may be had. Since tube 354 is non-conducting and tube 351 is a cathode follower, the voltage developed across condenser 350 remains until the next following pulse from A, that is, each change in voltage is added to the voltage developed by previous pulses from A, resulting in a step voltage wave as shown in Fig. 5*b* (Fig. 5*a* represents the pulses from pulse oscillator A).

When the combined amplitude of the steps of voltage across condenser 350 exceeds the bias on normally non-conducting tube 354, as indicated by the horizontal dash-dot line X, through curve 5*b* of Fig. 5, tube 354 starts to conduct. Transformer 353 is so poled that when vacuum tube 354 starts to conduct a positive voltage is applied to the grid of tube 354 which further increases the current. This action continues until grid current flows through the grid winding of transformer 353 and discharges condenser 350 at which time tube 354 again cuts off. Tube 354 is biased below cut-off by means of resistor 356 and condenser 357 in its cathode circuit. That is, each time tube 354 carries current, a charge is stored in condenser 357, and during the time interval during which 354 is cut-off, this charge starts to leak off through resistor 356, resulting in a positive voltage being developed there-across. Tube 355 is a conventional cathode output amplifier which offers a high input impedance to condenser 350 and a low output impedance for lead 101.

Curve 5*b* of Fig. 5 shows the step waves as they appear on the output lead 101 of the master step wave generator B. It will be noted that there are three risers as shown. This will supply three substep wave generators. If more substep voltage waves are desired, then the number of risers in waveform 5*b* should be increased accordingly. At the present state of the art, a practical limit of counting is 15, hence this circuit could supply a step voltage wave suitable for use with 15 substep wave generators, each substep wave generator producing step voltage waves of 15 risers each. This would allow spaced timing facilities for 224 channels.

The counter D, which is used to discharge the three substep wave generators E, F and G, includes three sections: (1) a selector section which contains a pulse transformer 302 and a normally non-conductive vacuum tube 304 which is biased to become operative on the last or top riser of the step voltage wave from the master step wave generator B, (2) a one shot pulse generator consisting of a normally non-conducting vacuum tube 312 and pulse transformer 314, which negatively charges condenser 310 after a predetermined number of top risers in the master step voltage wave have made the selector operative and (3) a discharge section consisting of a normally non-conducting vacuum tube 307 which removes incremental charges from condenser 310 each time the selector section is made operative.

The operation of this unit is as follows: The step voltage wave as shown in curve 5*b* is coupled to the grid of tube 304, via lead 101. Tube 304 is biased, by means of cathode bias, to become operative on the last riser as shown by the horizontal dash-dot line ($x$) in curve 5*b*. It should be noted that the last or top riser of this step voltage wave is a pulse due to the fact that the discharge of the step voltage wave occurs immediately following this riser. When the step wave riser exceeds the bias potential on tube 304 it conducts and a pulse of current flows through the anode winding of transformer 302, tube 304 and cathode condenser 305. When tube 304 ceases conducting, the current stored in cathode condenser 305 starts to leak off through resistor 306, thus developing the desired bias voltage. Condenser 305 is made sufficiently large in order that the change in voltage across resistor 306, during the time when 304 is non-conducting, is small compared to the D. C. bias voltage developed. Transformer 302 is so poled that a positive pulse is applied between the grid and cathode of discharge tube 307 each time 304 conducts. This positive pulse causes tube 307 to conduct and remove an incremental charge from condenser 310, the amount of charge removed being a function of the duration of the last riser in the master step voltage wave, the impedance of tube 307 when it is conducting and the values of resistor 308 and condenser 310. By properly choosing resistor 308 and condenser 310, the desired value of incremental charge may be removed. Each time tube 307 conducts, grid current flows, charging condenser 303, and this charge then leaks off through resistor 309 and develops sufficient bias to maintain tube 307 cut-off during the inoperative periods of the selector tube 304. After a predetermined number of top risers, the voltage developed across condenser 310 is reduced to a value which permits normally non-conducting tube 312 to start to conduct. Transformer 314 is so poled that when current starts to flow in tube 312 a positive voltage is applied to its grid which further increases the current. This action continues until the anode current no longer increases at which time the positive voltage applied to the grid of tube 312 starts to decrease, resulting in a decrease in anode current which in turn further decreases the grid voltage. This action continues until tube 312 is again cut-off. Tube 312 remains cut-off due to the negative voltage developed across condenser 310 as a result of grid current which followed and negatively charged condenser 310 during the conducting time of tube 312.

On the next top riser in the master step voltage wave, tube 304 conducts which in turn makes tube 307 conduct and remove another incremental charge from condenser 310. This action continues until the voltage across condenser 310 is again reduced to the cut-off potential of 312. The voltage waveform as it appears across condenser 310, is shown in curve 5c of Fig. 5. It should be noted that the step wave developed across condenser 310 never reaches zero amplitude since, when it exceeds the cut-off potential of tube 312, as indicated by the horizontal dash-dot line $E_{co}$, it is again reduced to a high negative value. By properly choosing the values of condenser 310 and resistor 308, the desired number of top risers may be counted. Each time tube 312 conducts, a positive pulse is developed across its cathode resistor 311. This pulse is coupled to the synchronizing pulse generator C, via lead 102. A positive pulse is also developed across the output winding of transformer 314 each time tube 312 conducts, and is coupled to the discharge tubes in substep wave generators E, F and G via lead 103.

Since the three substep wave generators E, F and G are identical with the exception of the values of the selector tube cathode resistors, the operation of only substep wave generator E will be described in detail. Similar components in the other substep wave generators F and G have been given the same reference numerals with prime and double prime notations. Each substep wave generator consists of five sections: (1) a position selector which produces a pulse to lock in a pulse oscillator in the proper time relation with the master step wave; (2) a pulse oscillator which produces two simultaneously occurring pulses, one to drive a step charge tube and the other to drive the ± PAM converter unit; (3) a step charge section which stores incremental charges in a step charge condenser; (4) a step wave discharge section which removes the charge stored in the step charge condenser; and (5) a cathode output amplifier which couples the step voltage wave to the various channel units in the channel bank assigned to that particular substep wave generator.

The operation of substep wave generator E is as follows: The master step voltage wave from generator B is coupled to grid limiting resistor 317 via lead 101. The other end of resistor 317 is connected to the grid of normally non-conducting selector vacuum tube 322, which is biased to become conducting at approximately ⅓ of the amplitude of the first riser of the master step voltage wave, as indicated by the horizontal dashed line $y$ passing through the number one riser of the waveform 5b in Fig. 5. When the amplitude of the number one riser reaches a value as indicated by the horizontal dashed line Z, the grid to cathode potential of tube 322 reaches zero. It remains at this value for the remainder of the step voltage wave cycle due to grid current flowing in resistor 317 and creating a voltage drop which approximately equals the increase in the step voltage wave above line Z. That is, as the step wave on lead 101 increases above a value indicated by line Z, the grid current in tube 322 increases and produces a voltage drop across resistor 317, approximately equal to the voltage increase on lead 101 above the value Z. Thus, current in tube 322 starts to flow and reaches a maximum on the first riser of the master step voltage wave. The current in tube 322 remains at this maximum value until the discharge occurs, at which time tube 322 again cuts off. Cathode bias is supplied to tube 322 by means of resistor 318 and condenser 319 as previously described for selector tube 304 in counter D. When tube 322 starts to conduct, a charge is stored in condenser 324, resulting in a pulse of current in transformer 328 which is so poled as to apply a positive voltage pulse to the grid of normally non-conducting vacuum tube 326, of a value sufficient to cause current flow therein. When current flow starts in tube 326, the grid voltage is further increased due to the connections of transformer 328 and hence, the anode current further increases. This action continues until the anode current of tube 326 reaches a maximum at which time the voltage applied to its grid starts to decrease which in turn decreases the anode current. This action continues until tube 326 is again cut-off. When tube 326 conducts, grid current flows, charging condenser 325, and during the time interval between successive risers in the master step voltage wave signal. This charge leaks off through grid leak resistor 320, developing a negative voltage thereacross, sufficient to maintain tube 326 non-conducting. After the initial flow of current in tube 322, its anode potential drops to a low value due to a voltage drop developed across resistor 323. The value of resistor 323 is chosen to provide the proper operating conditions for tube 322; that is, to reduce the voltage to a value where the anode power is within the limits required by the manufacturer for the type of tube used. The value of condenser 324 is made such that it completely discharges through resistor 323 during the time interval when tube 322 is cut-off. Each time tube 326 conducts, a voltage pulse is developed across the cathode winding of differentiating transformer 327. Resistor 321 is a damping resistor to critically damp 327. The waveform of the pulse appearing across the secondary winding of differentiating transformer 327, and appearing on lead 104 is shown in curve 5g of Fig. 5.

Winding 301 of transformer 328 is so poled that a positive voltage is applied between the grid and cathode of vacuum tube 332, causing it to conduct and store an incremental charge in condenser 333. Tube 332 is biased below cut-off by means of grid leak bias developed across resistor 329, during the time interval between successive pulses from transformer 328 as described for tube 307 in counter D. Resistor 331 and condenser 333 are chosen to give the desired incremental voltage step for each pulse from 328. The voltage across condenser 333 increases in steps as shown in curve 5d in Fig. 5, until the counter D produces a pulse which causes normally non-conducting tube 334 to become conducting and discharge condenser 333. Tube 334 is normally biased below cut-off due to grid leak bias developed across resistor 316 (shown in the counter D section) which results from the discharging of condenser 315 therethrough. Condenser 315 is charged by grid current from tubes 334, 334′ and 334″ each time the counter D produces a pulse.

Tube 335 is a normally conducting cathode output vacuum tube amplifier which couples the step wave thus developed to the channel bank H. The step waves developed by substep wave generators E, F and G are interleaved as shown in curves 5d, 5e and 5f of Fig. 5, respectively. It should be noted that the risers for substep wave generator E occur at the time of each number 1 riser in the master step voltage wave; the risers of substep wave generator F occur at the time of each number 2 riser of the master step voltage wave; and the risers of substep wave generator G occur at the time of the number 3 riser of the master step wave, and also note that the discharge of all substep voltage waves occur simultaneously and at the time when the counter D produces a pulse. Counter D counts four complete step waves produced by master step wave generator B.

The pulse developed across the secondary windings of differentiating transformers 327, 327′ and 327″ in the different substep wave generators E, F and G are as shown in waveforms 5g, 5h, and 5i, respectively. It is to be noted that the positive peaks of these pulses are delayed by an amount determined by the oscillatory frequency of the transformer after the occurrence time of the riser.

The ± PAM converter S (Fig. 3b) consists of three identical sections, h, j and k. Parts in sections j and k, similar to those in section h, have been given the same reference numbers but with prime and double prime notations. Since the operation of the three sections is identical, only the operation section h will be described in detail.

The damped oscillations as shown in waveform 5g of Fig. 5 are coupled to the grid of normally non-conducting vacuum tube 362 via lead 104. Tube 362 is normally biased below cut-off by means of bias voltage developed across cathode resistor 359. Condenser 360 maintains the bias voltage across resistor 359 during the non-conducting period of tube 363. The horizontal dashed line through the waveform of Fig. 5g indicates the potential above which tube 362 conducts. When tube 362 conducts, a negative pulse is developed across resistor 363. This negative pulse is coupled to the anode of normally conducting diode 366 via coupling condenser 365 and renders diode 366 non-conducting for the duration of the pulse. Current normally flowing through diode 366 develops a voltage across resistor 361, which is also in the cathode circuits of vacuum tubes 367 and 368, and this voltage is sufficient to render tubes 367 and 368 non-conducting. The value of resistor 361 is so chosen that when diode 366 cuts off, tubes 367 and 368 become conducting and operate as class A amplifiers. That is, during the conducting period of tubes 367 and 368, they operate on the linear portions of their respective grid voltage-anode current characteristic curves. Resistor 364 has the proper value to provide the desired bias voltage across resistor 361 when diode 366 is conducting.

The negative amplitude modulated channel pulses from lead 112 are coupled through coupling condenser 371 to the grid of tube 368. A grid leak 369 is connected between the grid of tube 368 and a tap on potentiometer 370 which forms part of a bleeder network between +Ebb and ground. The tap on potentiometer 370 is set at a value such that the grid-to-ground potential on tube 368 is zero when an unmodulated channel pulse is present on lead 112. Hence, the grid-to-ground potential varies positive and negative with respect to ground or zero potential when the channel pulses are modulated. Since the grid of tube 367 is directly connected to the ground, the potential on the grid of tube 368 varies plus and minus about the potential on the grid of tube 367, resulting in the peak amplitude of current in tube 368 being greater or less than the current in tube 367 by an amount proportional to the unbalance in the grid voltage. The current in tube 367 flows from +Ebb through resistor 373, and the current in tube 368 flows through resistor 374. It should be noted that the anodes of tubes 367′ and 367″ are also connected to resistor 373 and that the anodes of tubes 368′, 368″ and 375 are connected to resistor 374 in electrically parallel relationship with 368.

The current in tube 367 produces negative pulses across resistor 373 which are coupled to normally conducting vacuum tube 375, via coupling condenser 376 and renders it non-conducting for the duration of the pulses. The bias on tube 375 is set by means of cathode resistor 378 to a value such that the amplitude of current in tube 375, when it is conducting, is equal to the amplitude of current in tube 368 when it conducts with unmodulated channel pulses present on its grid. Condenser 379 maintains this bias for the time interval during which tube 375 is cut-off. Since tubes 367 and 368 become operative simultaneously and the pulse developed across resistor 373 due to current in tube 367 drives tube 375 below cut-off, it will be seen that the decrease in current in tube 375 is equal to the increase in current in tube 368 when the pulses applied to the grid of tube 368 are unmodulated. Therefore, since the anodes of tubes 368 and 375 are connected in parallel to resistor 374, the increase in current therein due to tube 368 becoming operative is exactly balanced by the decrease in current due to tube 375 becoming inoperative, resulting in no voltage change across resistor 374 when unmodulated channel pulses are present on the grid of tube 368.

If, however, the grid of tube 368 were more negative than the grid of tube 367 when they became operative, due to the channel pulse being of a higher negative value, then the increase in current in tube 368 would not be as great as the increase in current in tube 367. Therefore, the increase in current in tube 367 would not be as great as the decrease in current in tube 375, resulting in a positive pulse being developed across resistor 374. By similar reasoning, it may be shown that, when the negative channel pulse has an amplitude less than the unmodulated value, a negative pulse will be developed across resistor 374.

Since the anodes of all tubes 367, 367' and 367'' are connected to resistor 373, and the anodes of tubes 368, 368' and 368'' and 375 are connected to resistor 374, only one tube 375 is necessary to balance the three sections *h*, *j* and *k*.

The positive and negative pulses thus developed across resistor 374 are coupled via condenser 381 and lead 113 to the grid of normally conducting cathode output vacuum tube amplifier 384 which has a cathode resistor 382 in common with another cathode output tube 385. Tube 384 couples the pulses to output lead 115 which is connected to the R. F. transmitter.

The positive pulses developed across cathode resistor 311 in counter D, after counter D counts a predetermined number of top risers in the master step voltage wave from the master step wave generator B, are coupled to the grid of a normally conducting synchronizing pulse generator vacuum tube 387, via lead 102 and condenser 389. The operation of the synchronizing pulse generator is as follows: Resistor 390 located between the grid of tube 387 and *Ebb* is of very high value (of the order of 1 megohm) and maintains the grid-to-cathode potential of tube 387 at approximately zero, and when the positive pulse on lead 102 is present, condenser 389 is charged through the low impedance of the grid-to-cathode circuit. When the pulse on lead 102 ceases, the charge stored in condenser 389 starts to decrease through resistor 390, developing thereacross a negative voltage sufficient to render tube 387 non-conducting. The duration of the non-conducting period of tube 387 is determined by the time required for the charge stored in condenser 389 to leak off through resistor 390. The values of condenser 389 and resistor 390 are chosen to make this time longer than and preferably equal approximately to three times the duration of the channel pulse. The value of resistor 390 is chosen to be of a value which allows the power dissipated in the grid of tube 387 to be within the specifications presented by the manufacturer.

A positive pulse, as shown in waveform 5*p* of Fig. 5, is developed across resistor 388 as a result of tube 387 becoming non-conducting. This positive pulse is coupled to the grid of normally non-conducting vacuum tube 385 (video amplifier), via coupling condenser 386, rendering tube 385 conducting and thus developing a positive pulse on lead 115. Tube 385 is rendered non-conducting during the time interval between successive synchronizing pulses due to the discharge through resistor 383 of a charge stored in condenser 386. The charge stored on condenser 386 is caused by grid current from tube 385. When condenser 386 discharges through resistor 383 there is developed a negative bias across resistor 383 which is sufficient to supply the cut-off potential required.

The synchronizing pulse, curve 5*p*, occurs at a time immediately following the step wave discharge and when no channel pulses are being produced by the channel units. The combined channel and synchronizing pulses, as they appear on lead 115, is as shown in curve 5*q* of Fig. 5.

*Time sequence operation of transmitter*

A complete description of the operation of the circuit with respect to time will be given as follows: In order to include the operation of the step discharge and synchronizing pulse generator, and to simplify the description, the operation beginning at time R which is indicated by the vertical dash-dot line R through the curves of 5*a* to 5*q* of Fig. 5 will be given. Assume the channel pulse 9 in curve 5*o* (from channel 9 and appearing on lead 110 is at its maximum negative value as indicated by the lower dotted line. Also assume the negative pulse for channel 10 (from channel 10 and appearing on lead 112) is unmodulated as indicated by the solid line pulse 10 in curve 5*m*, and further assume that the pulse for channel 11 (from channel 11 and appearing on lead 111) is at its minimum negative value as indicated by the upper dotted line for pulse 11 in wave form 5*n*.

A pulse from the crystal controlled pulse oscillator A occurs at time R (see pulse 9 in curve 5*a*) and causes a riser in the master step voltage wave to occur as shown in curve 5*b*. This riser causes the master step voltage wave to discharge and start a new counting cycle.

The riser in the master step voltage wave caused by pulse 9 in curve 5*a* causes a riser to occur across the condenser in the counter D as shown in curve 5*c* and also a riser to occur in the step voltage wave output of the sub step voltage wave generator G as shown at 9 in curve 5*f*. The riser 9 in curve 5*f* is coupled to channel bank K, which causes channel 9 to produce on lead 110 a negative pulse, as shown at 9 in curve 5*o*. This negative pulse is coupled to the grid of tube 368'' which is biased below cut-off; hence, nothing happens in the anode circuit of 368'' at this time. A negative pulse as shown in curve 5*i* is also developed across the secondary winding of differentiating transformer 327'' in the step wave generator G, at the occurrence time of the riser. A short time later, the pulse across the secondary winding of 327'' reverses and rises above the cut-off bias on tube 362'' in the ±PAM converter S causing it to conduct and, in turn, produce a negative pulse on lead 106 sufficient to cause diode 366'' to cease conducting which, in turn, allows tubes 367'' and 368'' to become operative by reducing their common cathode bias voltage, as shown at 9 in curve 5*l*. Tube 375 in the converter S becomes non-conductive due to the negative pulse developed across resistor 373 (caused by current in tube 367'') and since the pulse is assumed to be at its most negative value, the increase in current in tube 368'' is smaller than the decrease in current in tube 375. Hence, a positive pulse is developed across resistor 374, which in turn is coupled to lead 115 through the coupling tube 384. This pulse is shown by the positive portion of the dotted pulse 9 in waveform 5*q*. After a period of time equal to the duration of the positive pulse 9 above the dashed line in curve 5*i*, tubes 367'' and 368'' again cut-off and tube 375 again becomes conductive. A short time later, the negative channel pulse 9, curve 5*o*, ceases and again, since 368'' is cut-off, nothing happens.

On the next following pulse from the pulse oscillator, as shown at 10, curve 5*a*, a number one riser occurs in the master step voltage wave of curve 5b. This riser causes selector tube 322 in substep voltage wave generator E to produce a pulse, which in turn produces a riser in the step voltage wave output of E, as shown at 10 in curve 5d, which in turn causes one channel in bank H to produce a pulse which is coupled to the grid of tube 368 in section H of the ± PAM converter S. Since at this time 368 is cut-off, nothing new happens. At the occurrence time of riser 10, a negative pulse is developed across the secondary winding of differentiating transformer 327 in the cathode of tube 326 in substep wave generator E. After a short period of time, determined by the natural frequency of 327, a positive pulse as indicated at 10 by waveform 5g exceeds the cut-off potential of tube 362 in section h of the ± PAM converter rendering it conducting and thus producing a pulse which causes normally conducting diode 366 to become non-conducting, thus developing a negative pulse as shown in waveform 5j across resistor 361 which in turn allows tubes 367 and 368 to become conductive. Tube 367 develops across resistor 373 a negative pulse which again makes tube 375 non-conductive, and since it is assumed that the negative pulse produced by channel 10 is unmodulated, the increase in current in tube 368 is exactly balanced by the decrease in current in tube 375, resulting in no change in voltage across resistor 374. Hence, no pulse is present on lead 115 at this time, as shown in the solid line at 10 in waveform 5q. When the pulse applied to diode 366 ceases, tubes 367 and 368 again cut-off and tube 375 conducts. A short time later the negative channel pulse applied to the grid of tube 368 ceases, but since tube 368 is cut-off at this time, nothing happens.

On the next following pulse from the crystal-controlled pulse oscillator A, as shown at 11, waveform 5a, the #2 riser in the master step voltage wave occurs, as shown in waveform 5b. This causes selector tube 322′ in substep wave generator F to become conductive, which results in a riser as shown at 11 in curve 5e. This riser causes channel 11 in channel bank J to produce a negative pulse as shown at 11 in curve 5n, which in turn is coupled to the grid of tube 368′ in section J of the ± PAM converter unit S. Since at this time tube 368′ is cut-off, nothing happens. At the time of occurrence of riser number 11, a negative pulse as shown at 11 in waveform 5h is developed across the secondary winding of differentiating transformer 327′ in the cathode of tube 326′ in substep wave generator F and is coupled to the grid of tube 362′ in section J of the ± PAM converter S. After a short period of time determined by the natural frequency of 327′ the pulse across the secondary winding of 327′ reverses and exceeds the cut-off potential of tube 362′ as indicated by the horizontal dashed line in waveform 5h. This causes tube 362′ to conduct, which in turn renders diode 366′ non-conducting, thus producing a pulse as shown at 11 in waveform 5k to occur across resistor 361′ allowing tubes 367′ and 368′ to conduct. Tube 367′ develops across resistor 373 a negative pulse which again makes tube 375 non-conductive. Since it is assumed that the negative pulse applied to the grid of tube 368′ is at its minimum of negative value, the current decrease in resistor 374 due to tube 375 being made non-conducting is less than the current increase in resistor 374 due to tube 368′ becoming operative. Hence, a negative pulse is developed across resistor 374 and is coupled to lead 115 through coupling tube 384. Diode 366′ against conducts when tube 362 becomes non-conductive. The pulse from channel 11 in channel bank J ceases, but since tube 368′ is cut-off at this time, nothing happens.

On the next following pulse from pulse oscillator A as shown at S in waveform 5a, a riser occurs in the master step voltage wave generator which causes it to discharge. The occurence of this top riser results in a riser occurring in condenser 310 in counter D. This riser causes the one shot oscillator 312 to produce a pulse which discharges all step voltage wave generators simultaneously, as shown, and also to produce a positive pulse across resistor 311 which is coupled to synchronizing pulse generator C via lead 102. Synchronizing pulse generator C then produces a pulse across resistor 388 in a manner as previously described. The pulse thus developed across resistor 388 and shown in waveform 5p is coupled to lead 115 by normally non-conducting coupling tube 385 and appears as shown at S in curve 5q between the pulses from channel 11 and 1.

The next following pulse from A as shown at 1 in curve 5a produces a number one riser in the curve 5b of Fig. 5 which in turn produces a number one riser in curve 5d. The operation of all channels over a complete time period may be similarly described.

*Transmitting channel unit*

Fig. 4 shows, schematically, the circuit details of one channel unit such as might be used in channel banks H, J and K. The operation of this unit is as follows: A step voltage wave is coupled to the grid of normally non-conducting vacuum tube 508 through a grid limiting resistor 501. Anode potential is supplied to tube 508 from +Ebb over a path including series connected resistors 503 and 502. Tube 508 is biased to become operative on any desired riser in the applied step voltage wave by means of cathode potentiometer 510. Each time tube 508 conducts, a charge is stored in condenser 509. This charge leaks off through potentiometer 510 during the time when tube 508 is non-conducting, and develops a voltage of the desired amplitude thereacross. The amplitude of each riser in the applied step voltage wave is made large compared to the cut-off potential of tube 508 in order that tube 508 may be driven from below cut-off to zero grid-to-cathode potential on the particular riser which makes tube 508 operative. When the grid-to-cathode voltage of tube 508 reaches zero, it remains at zero for the remainder of the applied step voltage due to a voltage drop being developed across resistor 501 due to grid current in tube 508. In other words, as the input wave increases above the value at which the grid-to-cathode potential of tube 508 reaches zero, a drop equal to the increase in input voltage is developed across resistor 501 due to grid current from 508. As a result, the anode voltage of tube 508 suddenly drops to a low value when tube 508 conducts and remains at this low value for the remainder of the step voltage wave.

Pulse modulator vacuum tube 514 is made normally non-conducting by means of a bias voltage developed across resistor 513 due to current flowing from +Ebb through resistor 505, inductance 506, diode 507 and resistor 513 to ground.

When tube 508 becomes conductive, electrons flow into the anode end of condenser 504, thus causing electrons from the other plate of condenser 504 to flow through inductance 506. This results in a negative voltage being developed across 506 which reduces the anode potential of diode 507 below its cathode potential thereby making it non-conductive. When diode 506 becomes non-conductive, the bias on tube 514 is removed and current starts to flow therein. The amplitude of current flow in 514 is controlled by the modulating signal applied between its grid and cathode by means of audio transformer 516 and potentiometer 515. Resistor 513 is of a value such that tube 514 operates as a class A amplifier during its conducting period. That is, during the conductive period of tube 514, it operates on the linear portion of its grid voltage-anode current characteristic curve. Tube 514 conducts for a period of time determined by the time determined by the time interval during which diode 507 is cut-off which time interval, in turn, is controlled by the values of condenser 504 and inductance 506. Condenser 504 and inductance 506 may be considered a series tuned circuit between the anode of tube 508 and resistor 505. When tube 504 starts to conduct, a negative voltage is developed across diode 507 which causes it to cease conducting and hence offers a high impedance to the tuned circuit which then tends to oscillate at its natural frequency determined by the values of condenser 504 and inductance 506. When this oscillation again rises to a value above the cathode potential of diode 507, it conducts and applies considerable damping across the network thus dissipating the energy stored therein.

The anode of tube 514 is connected, in an electrically parallel relationship with the anodes of similar tubes in the other channel units in the same bank, to a common load resistor 517. Since each channel in the bank is made operative on a different riser in the applied step voltage wave, and since the length of the pulse applied to each modulator tube is short compared to the spacing between the successive risers in the step voltage wave, a series of non-overlapping, negative, amplitude modulated pulses as shown by waveform 906 in Fig. 4 is developed across resistor 517 and coupled via lead 110 or 111 or 112 to the section of the ± PAM converter S assigned to that particular channel.

Resistor 503 and condenser 511 form a compensation network which maintains the cathode to anode potential, before conduction, constant regardless of the riser upon which tube 508 is made operative. That is, as the cathode voltage is increased due to operating on high value risers, the voltage at point P automatically increases by an amount equal to the increase in cathode voltage, resulting in the potential between point P and cathode remaining constant. The operation is as follows: On the lower risers, tube 508 carries current for a considerably longer period of time than on the top or higher risers. Thus, the average current in tube 508 depends upon the riser upon which tube 508 becomes conducting. When tube 508 conducts on the lower risers, the larger average current flow develops a larger voltage drop across resistor 503 than when tube 508 conducts on the higher risers. Since the cathode bias is lower when tube 508 is made conducting on the lower risers, than when conducting on the higher risers, the value of resistor 503 may be chosen to be of a value such that the drop there-across decreases in direct proportion to the increase in cathode voltage, since the average anode current varies in a linear fashion with the cathode bias. Condenser 511 is used to bypass the A. C. components of plate current and thereby provide a D. C. voltage at point P.

Resistor 505 is chosen to provide the desired drop across resistor 513 and condenser 512 is used as a bypass condenser to maintain point M at ground potential for the A. C. components of current in 506.

*Operation of receiving system*

The operation of the receiving multiplex equipment will now be given with particular reference to Figs. 6*a*, 6*b* and 8. The same reference numerals appearing in Figs. 2 and 6*a*, 6*b* represent the same circuit elements. The video pulse train from the radio frequency receiver (201 of Fig. 2), as shown in waveform 8*a* of Fig. 8 is coupled to the grid of a normally conducting cathode output amplifier vacuum tube 404, lead 301 and coupling condenser 401. Resistor 402 in the grid circuit of 404 forms the ground return path for D. C. The pulse train developed across resistor 403 by tube 404 is coupled via lead 307 to all channel units which have their video input terminals connected in parallel electrically. The pulse train developed across cathode resistor 403 is also coupled to a normally non-conducting amplifier vacuum tube 408 via coupling condenser 405. Each synchronizing pulse and the positive portion of each modulated channel pulse causes tube 408 to conduct and as a result develop pulses across anode resistor 409 as shown in curve 8*b*. Resistor 407 and condenser 413 supply the cut-off bias for tube 408, and resistor 406 provides the D. C. return path for the grid. The negative pulses developed across resistor 409 are coupled to the grid of a normally conducting vacuum tube 412, via coupling condenser 410. Each synchronizing pulse and each fully modulated channel pulse causes tube 412 to be cut-off. Since the duration of the synchronizing pulse is made long compared to duration of the channel pulses, tube 412 is cut-off for a longer period of time when the synchronizing pulses are present that when the channel pulses are present on its grid. Resistor 414 provides the D. C. return path for the grid of tube 412. Each time tube 412 cuts off, condenser 418 starts to charge up through resistor 411, resulting in the voltage developed there-across increasing in an exponential manner toward $\pm Ebb$ as a limit. The values of resistor 411 and condenser 418 are chosen to be of such a value that the voltage rise across 418 is approximately linear with respect to time for the duration of the synchronizing pulse. At the end of each pulse applied to the grid of tube 412, it again becomes conducting and discharges condenser 418 resulting in the voltage developed there-across dropping to a low value. It will readily be seen that the rise in voltage across condenser 418 is higher when the synchronizing pulse is present on its grid than when the channel pulses are present. The sawtooth waves thus developed across condenser 418 (see curve 8*c*) are coupled to the grid of a normally non-conducting vacuum tube 423 which is biased in such a manner that it conducts only on the higher amplitude synchronizing pulse and remains cut-off during the time interval between successive synchronizing pulses. Bias voltage is supplied to tube 423 by means of cathode resistor 420 and bypass condenser 421. The waveform 8*c* of Fig. 8 indicates the sawtooth wave developed across condenser 418 and applied to the grid of tube 423. The horizontal dash-dot line indicates the potential above which tube 423 becomes conducting. Inductance 417 and resistor 416 in the anode circuit of tube 423 for a differentiating circuit across which is produced a positive pulse at the end of each synchronizing pulse. That is, at the start of current flow in inductance 417, due to tube 423 becoming conducting, a negative pulse is developed there-across and when tube 423 cuts off at the end of each pulse, a positive pulse is developed across 417 due to the field produced there-in collapsing. Resistor 416 critically damps 417 to prevent undesired oscillations. The pulses developed across 417 are coupled to the grid of a normally non-conducting vacuum tube 424 via coupling condenser 418.

The pulses coupled to the grid of tube 424 are as shown in curve 8*d* of Fig. 8. The horizontal dashed line *Eco* indicates the potential above which tube 424 becomes conducting. Bias is supplied to the grid of tube 424 via cathode resistor 425 and by-pass condenser 426. Resistor 422 in the grid circuit of tube 424 provided the D. C. path to ground for the grid. A pulse transformer 427 in the anode circuit of tube 427 is so poled that a positive pulse is applied to the grid of normally non-conducting cathode output vacuum tube 430 each time 424 conducts. The positive pulses as shown in curve 8*e* developed across resistor 431 by tube 430 are coupled to the discharge tubes in the three substep wave generators via coupling condenser 432 and lead 308. Resistor 433 provides a common D. C. return path for all discharge tubes. The positive pulses developed across resistor 431 are also coupled to the grid of a normally conducting vacuum tube 437 via condenser 434. Condenser 434 and potentiometer 435 in the grid circuit of tube 437 provide a differentiating network which operates as follows: On each positive pulse across resistor 431 electron current from the grid of tube 437 flows into condenser 434. When the pulse across resistor 431 ceases, the charge stored in condenser 434 leaks off through potentiometer 435 developing a voltage there-across sufficient to cause tube 437 to become non-conducting. The duration of the non-conducting period of tube 437 is determined by the values of potentiometer 435 and condenser 434. The value of impedance offered by potentiometer 435 may be varied by means of the adjustable tap thereon. The result is a positive pulse developed across anode resistor 436. The duration of this pulse is manually adjustable by means of the potentiometer 435 in the grid circuit of tube 437. This positive pulse is coupled to the grid of a normally non-conducting vacuum tube 493 via coupling condenser 439. Cut-off bias for tube 493 is supplied by means of cathode resistor 444 and condenser 445. Resistor 438 provides the D. C. return path for the grid of tube 493. The result is that tube 493 carries current for a period of time determined by the setting of potentiometer 435. When current starts to flow in tube 493, a negative pulse is developed across the inductance 441 and when current ceases a positive pulse is developed there-across in a manner similar to that described for tube 423, and inductance 417. The occurrence time of the positive pulse is a function of the setting of potentiometer 435. Resistor 440 critically damps the inductance 441. The pulses developed across inductance 441 are coupled to the grid of a normally non-conducting vacuum tube 451 which is biased below cut-off by means of cathode resistor 447 and condenser 448. Each positive pulse across 441 causes tube 451 to become conducting and produce a negative pulse across its anode resistor 443 as shown in curve 8*f*.

This last negative pulse is coupled to a tuned circuit consisting of inductance 450 and condenser 449 which is tuned to the frequency of the crystal in the transmitting multiplex equipment. Condenser 452 must be of low capacity in order to prevent damping across the tuned circuit. The result is a slightly damped sine wave, shown in curve 8*g*, is developed across 450 and applied to the grid of a cathode amplifier vacuum tube 456 which has a cathode resistor common to common tube 457. Tubes 456 and 457 form a clipper and limiter stage. That is, on the negative half cycles of the oscillations applied to the grid of tube 456, it becomes non-conducting. On the positive half cycles of oscillations across 450 tube 456 conducts and develops a voltage across resistor 456 sufficient to cause tube 457 to become non-conducting. The result is a square wave voltage is developed across anode resistor 454 and is coupled to resistor 458 in the grid circuit of tube 461 via condenser 455. Condenser 455 and resistor 458 form an RC differentiator network which produces alternate positive and negative pulses. That is, on the positive going portion of each cycle of the sinusoidal voltage developed across resistor 454, a positive pulse is developed across resistor 458, and on the negative going portion, a negative pulse is developed across resistor 458.

Tube 461, together with pulse transformer 462, forms a pulse oscillator identical to that driven by the crystal oscillator in the transmitting unit. The result is that pulses are produced on the grid of a master step wave generator charge tube of the same shape and frequency as those applied to a similar step charge tube in the transmitting equipment. The master step wave generator consisting of vacuum tubes 466, 468, 470 and 471 operates in a manner similar to that described for the master step wave generator in the transmitting unit. Tube 466 charges a storage condenser 467 across which is coupled the anode of a normally non-conducting tube 468, the grid of a cathode output amplifier 470 and the grid of a one-shot oscillator 471. Tube 471 is biased by means of resistor 474 and condenser 473 so that a predetermined number of pulses (set to be the same as the transmitter unit) cause the voltage across condenser 467 to rise to a value which causes tube 471 to start to conduct and, due to connections of transformer 472, continue to conduct until condenser 467 is discharged. Tube 468 provides a locking-in arrangement to force the master step wave generator to be in the proper time relation with respect to the transmitting equipment. That is, on each received synchronizing pulse, tube 468 becomes conducting and insures the discharge of condenser 467 to occur at this time, thus starting a new cycle of counting of the master step wave generator. Once the master step wave generator is in the proper time relation with respect to the received synchronizing pulse, it remains so fixed unless the path between the transmitter and receiver is interrupted, after which the received synchronizing pulse again causes it to come into the proper time relation.

That is, the master step wave generator, in the absence of pulses from the synchronizing pulse separator, could start counting on any pulse from the pulse oscillator. But when the synchronizing pulse is applied to tube 468 counting is assured to start on a desired pulse. Curve 8*h* shows the waveform from the pulse oscillator (note that this waveform is identical to that of 5a) and curve 8i shows the step voltage wave from the master step wave generator in the receiver (also note curves 8i and 5b are identical).

It will be seen that the received synchronizing pulse, curve 8e, occurs at a time following the discharge of the master step voltage wave and preceding the occurrence of the number one riser, that is, after condenser 467 has been discharged by tube 471. If condenser 467 had a charge at this time due to the master step wave generator being out of step, condenser 467 would be discharged by tube 468 and the number one riser would occur at the proper time. It should be further noted that there are several cycles of the step voltage wave of curve 8i between successive received synchronizing pulses.

Substep wave generators 208, 209 and 210 are identical to the sub-step wave generators in the transmitting unit. Components in 209 and 210 similar to those in 208, are given prime and double prime notations.

A very brief description of substep wave generator will be given here since the operation is the same as that described for the substep wave generators in the transmitter with the exception that the differentiating component in the cathode of the pulse oscillator has been eliminated.

Vacuum tube 481 is a position selector which causes pulse oscillator vacuum tube 484 to produce a pulse at the time of occurrence of a particular riser in the step wave from the master step wave generator applied to the grid of tube 481 through resistor 475. Each pulse from tube 484 causes a charge to be stored in condenser 487. The anode of a normally non-conducting discharge tube 490 is connected to the cathode end of condenser 487 and causes it to be discharged at the time of arrival of the synchronizing pulse (curve 8e). Vacuum tubes 490, 490′ and 490″ and 468 are supplied bias by means of grid leak 433 and condenser 432. That is, grid current flows into condenser 432 each time the received synchronizing pulse produces a pulse across resistor 431. This charge leaks off during the time interval between successive pulses across resistor 431 developing a bias across 432 sufficient to maintain the step discharge tubes non-conducting. A cathode follower vacuum tube 491 couples the step voltage wave developed across condenser 489 to a bank of receiving channel units H—1.

The step voltage waves generated by substep wave generators 208, 209 and 210, are as shown in waveforms 8j, 8k and 8l respectively. Note that all three step waves are discharged at the end of the received synchronizing pulse.

The step voltage wave generated by substep wave generator 208 is coupled to a bank of receiving channel units H—1 by means of cathode output amplifier tube 491. The step voltage wave generated by substep wave generator 209 is coupled to a bank of receiving channel units J—1 by means of cathode output amplifier 491′ and the step voltage wave output from substep wave generator 210 is coupled to a bank of receiving channel units K—1 via cathode output tube 491″.

*Receiving channel unit*

All receiving channel units are identical except for the bias on the position selector tube. The circuit details of a typical receiving channel unit are shown in Fig. 7. The operation of this circuit is as follows: Vacuum tube 608 is the channel position selector which allocates the channel unit to its proper position in the step voltage wave applied to the channel in a manner similar to that described for the channel position selector in the transmitting channel unit (tube 508, Fig. 4). It is for this reason that the components 601 to 614 of Fig. 7 have been given the same last two reference number designations as the correspondingly located components of Fig. 4. Bias to tube 608 is supplied by means of cathode potentiometer 610 and condenser 609. Resistor 603 and condenser 611 form a compensation network which maintains the D. C. voltage between point P and the cathode constant regardless of the riser upon which tube 608 is made operative. Each time the selector is made operative, due to amplitude of the step wave exceeding the bias on tube 608, a negative pulse of voltage is developed across coil 606 in a manner similar to that described for the transmitting channel unit (coil 506, Fig. 4). This negative pulse causes normally conducting diode 607 to cease conducting by reducing its anode potential to a value lower than that present on its cathode. When diode 607 is conducting, a positive voltage is developed across resistor 613 sufficient to render tube 614 in-operative. The value of resistor 613 is so chosen that when diode 607 is cut-off, tube 614 operates as a class A amplifier. That is, it operates on the linear portion of its grid-voltage-anode current characteristic curve. Resistor 605 is chosen to provide the desired amplitude of voltage drop across resistor 613 when diode 607 is conducting.

The pulse train from the receiver video output is coupled to the grid of tube 614 via lead 307 which is common to similar grids of all receiving channel units. Diode 607 is cut off for a period of time equal to the duration of the applied signal pulse. The result is tube 614 is made conducting for a period time equal to the duration of the applied channel pulses and at a time when a pulse from a particular channel is present on its grid. That is, once each frame, tube 614 is made conducting when the pulse assigned to the channel is present on its grid. The pulses amplified by tube 614 are coupled to a low pass filter 617 via coupling condenser 616. Anode resistor 615 is of a value such that the filter is driven from its proper impedance. The filter is terminated by a potentiometer 618 which has an impedance equal to the terminating impedance required by the filter. A tap on potentiometer 618 provides a means of manually adjusting the amplitude of the audio signal coupled to the audio amplifier which consists of two triode type tubes 621 and 626 operating as class A amplifiers. The grid of a voltage amplifier tube 621 is directly connected to the tap on potentiometer 618 as shown in Fig. 7 and bias is supplied by means of resistor 623 and condenser 622. The amplified audio signal developed across anode resistor 619 is coupled to the grid of output amplifier tube 626 via coupling condenser 620. Resistor 624 provides the ground return path for the grid of tube 626. Resistor 625 is an un-bypassed cathode degeneration resistor in the cathode circuit of tube 626. Transformer 627 in the anode circuit of tube 626 is an output type transformer which matches the impedance of tube 626 to the output line impedance. The operation of the low pass filter 617 is as follows: The signal developed across 615 when tube 614 becomes conducting is a pulse, the amplitude of which is varied in accordance with the modulating signal applied to the transmitter channel unit. Hence this signal contains audio frequencies and pulse frequencies, that is frequencies equal to the repetition rate of the channel pulse and all harmonics thereof. The low pass filter is designed to pass the audio frequencies with little attention whereas it provides high attenuation for the pulse frequencies and all harmonics thereof. The result is the audio signal present across resistor 618 is large compared to the pulse frequencies.

*Time sequence operation of receiver*

The operation of the receiving portion with time then is as follows: Assume as in the case of the transmitting unit that the operation begins at time R in Fig. 8, indicated by the vertical dash-dot line. Also assume the pulse for channel 9 is at its maximum positive amplitude, the channel pulse for 10 is zero, and the channel pulse for 11 is at its maximum negative amplitude.

Since the channel pulse for channel 9 is assumed to have its maximum positive value, it will follow the positive portion of the dotted pulse 9 shown in curve 8*a*. This pulse will cause normally non-conducting tube 408 in Fig. 6 to conduct and produce a negative pulse at its anode as shown by the negative dotted pulse 9 in curve 8*b*. The negative pulse in turn causes normally conducting tube 412 to cease conducting for a period of time equal to the pulse length. This causes the voltage across condenser 418 to rise in a linear fashion as shown by the dotted triangular pulse 9 in Fig. 8*c*. Since the duration of the channel pulse is short compared to the length of the synchronizing pulse, the voltage across 418 does not exceed the bias on tube 423 as shown by the dash-dot line Eco in curve 8*c*. Hence, nothing happens at this time in tubes 423, 424, 430, 437, 493 and 451.

The positive going edge of sine wave 9 as shown in curve 8*g* causes the pulse oscillator 461 to produce a pulse 9 as shown in curve 8*h*. The oscillating circuit is oscillating at time R as a result of the preceding synchronizing pulse.

Pulse 9 from the pulse oscillator causes a riser to occur in the master step wave generator output as shown at 9 in curve 8*i*. This pulse also causes the discharge in the master step voltage wave generator to occur. The riser 9 in the master step voltage wave generator causes a riser to occur in substep voltage wave generator 210 output as shown in waveform 8*d*. Riser 9 in curve 8*i* causes channel 9 in bank K—1 to produce a gate pulse as shown in curve 8*v*. This pulse allows the tube 614 (Fig. 7) in channel 9 to become operative, at a time when the incoming pulse 9 curve 8*a* is present on its grid. This pulse is coupled to the low pass filter which operates in a manner as previously explained.

The next following signal pulse 10 which is assumed to have zero amplitude is coupled to the grid of the tube 408 but since this tube is normally non-conducting, nothing now happens. Since the oscillatory circuit is still oscillating as a result of the previous synchronizing pulse, the positive going edge of sine wave 10 curve 8*g* causes the pulse oscillator to produce pulse 10 curve 8*h* which in turn causes a number 1 riser (see 10 curve 8i) to occur in the master step wave generator output. This riser in turn causes a number 10 riser to occur in the output of substep wave generator 208 which in turn causes a gate pulse as shown in curve 8*w* to occur in channel 10 in bank H—1 and hence allows the tube 614 (Fig. 7) in this channel to become operative.

On the next incoming signal pulse which was assumed to be at its maximum negative value, tube 408 Fig. 6 still remains cutoff. Hence nothing happens in the synchronizing pulse selector circuits at this time. However, the oscillatory circuit is still oscillating as a result of being energized by the preceding synchronizing pulse and the positive going edge of sine wave 11 causes the pulse oscillator to produce pulse 11 which causes a number 2 riser (11 curve 8*i*) to occur. This riser in turn causes riser 11 to occur in the output of substep voltage wave generator 209 which in turn causes a gate pulse to occur in channel 11 in bank J—1, thus allowing the tube 614 in channel 11 to become operative for the duration of the gate.

The next incoming pulse is the synchronizing pulse. This pulse causes normally non-conducting tube 408 in Fig. 6 to become conducting and hence develops a negative pulse (*s* in curve 8*b*) across the grid of normally conducting tube 412. This causes tube 412 to cease conducting and hence the voltage across 418 starts to rise. Since the longer duration synchronizing pulse is present, the voltage on the grid of tube 423 rises above the cut-off potential of this tube as indicated by the horizontal dash-dot line in curve 8*c*. This causes a slight negative voltage to be developed across coil 417 in the anode circuit of tube 423. (This voltage is low in amplitude since the rate of change of current is low at this time.)

At the end of the synchronizing pulse, tube 412 again becomes conducting and discharges condenser 418 which causes the voltage on the grid of tube 423 to suddenly drop below the cut-off potential and hence its anode current ceases abruptly resulting in a positive pulse being developed as shown in curve 8*d*. This pulse causes normaly non-conducting tube 424 to become operative (the cut-off potential of tube 424 is indicated by the horizontal dashed line in curve 8*d*). Transformer 427 is so poled that a positive pulse as shown in curve 8*e* is applied to the grid of cathode output tube 430. This tube couples the pulse to discharge tubes 490, 490′ and 490″ in the substep voltage wave generators and causes the discharge of the three sub-step voltage waves to occur as shown at *s* in waveforms 8*j*, 8*k* and 8*i*. The discharge pulse is also coupled to discharge tube 468 in the master step wave generator. Since the master step wave generator is operating in the proper manner it will be noted that this step wave has already been discharged due to the pulse from the pulse oscillator as shown in curve 8*i*. If the master step wave had not been discharged, due to its being out of step, tube 468 would discharge it at this time and insure its starting the new cycle in the proper time relationship. Cut-off bias for tubes 490, 490′ and 490″ and 468 is obtained by means of grid leak 433 and condenser 432.

The positive pulse developed across resistor 431 is also coupled to the grid of a normally conducting tube 437 by means of condenser 434. Condenser 434 and resistor 435 form a differentiating network which operates as follows: For the duration of the applied pulse electrons from the grid of tube 437 flow into condenser 434. After the pulse across 431 ceases, the charge on condenser 434 leaks off through resistor 435 and develops a voltage thereacross sufficient to render 437 non-conducting. The time interval during which tube 437 is non-conducting is a function of the values of 434 and 435. The value of 435 is made adjustable to provide a manual control of this cut-off time. The result is a positive pulse of a manually controlled time duration is developed on the grid of a normally non-conducting tube 493 which has a differentiating transformer in its anode circuit. At the beginning of the pulse applied to the grid of 493 a negative pulse is developed across 441 and at the end of the applied pulse a positive pulse is developed thereacross. This positive pulse causes a normally non-conducting tube 451 to conduct and develop a negative pulse across resistor 443 as shown in curve 8*f*. This pulse is coupled to the tuned circuit by means of a small coupling condenser 452 and starts a new cycle of damped oscillations as shown in curve 8*g*. The damped wave across the tuned circuit is coupled to a clipper limiter stage consisting of tubes 456 and 457, and the resulting square wave is used to lock in the pulse oscillator 461 as previously described.

It will be seen that this is a complete system which provides timing facilities for a large number of channel *s* and that channels may be added in banks or groups as the communications requirements change. Each transmitting channel may consist of one twin triode type tube per channel unit and each receiving channel unit may require two twin triode type tubes.

Various individual circuit arrangements employed in the system of the invention are similar to those described in my copending applications: Serial No. 751,698, filed June 2, 1947; Serial No. 743,119, filed April 22, 1947; Serial No. 737,901, filed March 28, 1947; and Serial No. 623,127, filed October 18, 1945, now Patent No. 2,480,582, granted August 30, 1949, to which reference is herein made.

In one embodiment of the invention actually tried out in practice in a 30 channel system, the lengths of the amplitude modulated channel pulses (curve 5*q* of Fig. 5) were each 2 microseconds separated from each other by a time interval of 3.7 microseconds. The synchronizing pulse S of curve 5*q* was 6 microseconds. The frequency of the crystal controlled pulse oscillator A (Figs. 1 and 3*a*) was 270,000 pulses per second. The master step wave generator B produced three steps per cycle, while the substep wave generators E, F and G each produced 11 steps per cycle. Each substep wave generator fed a bank of 10 channel units. The radio frequency carrier was approximately 4000 megs which was frequency modulated by the pulses of curve 5*q*. The reeciver was a frequency modulation superheterodyne type and employed a cross-talk balancing arrangement embodying the principles described in the copending application of Clarence W. Hansell, Serial No. 761,210, filed July 16, 1947. It should be understood that the invention is not limited to 30 channels since, if desired, the number of risers from the master step wave generator can be increased with a corresponding increase in the number of substep wave generators, so that a system having as many as 200 channels can be constructed using the principles of the invention.

What is claimed is:

1. A pulse time division multiplex system comprising a generator producing a master step voltage wave having a predetermined number of risers, a plurality of substep voltage wave generators each controlled by a different riser in the master step voltage wave, a plurality of groups of pulse producing and modulating units, means respectively controlling different groups of units from the output waves of said substep voltage wave generators, each substep wave generator controlling a single group of said units, and a counter coupled to said master step wave generator and to said substep wave generators and operative after a certain number of cycles of said master step voltage wave for simultaneously terminating the output waves from said substep wave generators.

2. A pulse time division multiplex system comprising a generator producing a master step voltage wave having a predetermined number of risers, a plurality of substep voltage wave generators each controlled by a different riser in the master step voltage wave, a plurality of groups of pulse producing and modulation units, means respectively controlling different groups of units from the output waves of said substep voltage wave generators, each substep wave generator controlling a single group of said units, a counter coupled to said master step wave generator and to said substep wave generators and operative after a certain number of cycles of said master step voltage wave for simultaneously terminating the output waves from said substep wave generators, a synchronizing pulse generator under control of said counter and operative following the termination of the output waves from said substep wave generators, and a common output circuit for the pulses produced by said units and for the pulses produced by said units and for the pulses produced by said synchronizing pulse generator.

3. A pulse time division multiplex system comcomprising a generator producing a master step voltage wave having a predetermined number of risers, a plurality of substep voltage wave generators each controlled by a different riser in the master step voltage wave, a plurality of groups of pulse producing and modulating units, means respectively controlling different groups of units from the output waves of said substep voltage wave generators, each substep wave generator controlling a single group of said units, the pulse producing units in each group being differently biased to produce pulses on different risers in the step voltage wave produced by its associated substep voltage wave generator, and a counter coupled to said master step wave generator and to said substep wave generators and operative after a certain number of cycles of said master step voltage wave for simultaneously terminating the output waves from said substep wave generators.

4. A pulse time division multiplex system comprising a generator producing a master step voltage wave having a predetermined number of risers, a plurality of substep voltage wave generators each controlled by a different riser in the master step voltage wave, a plurality of groups of pulse producing and modulating units, means respectively controlling different groups of units from the output waves of said substep voltage wave generators, each substep wave generator controlling a single group of said units, and a counter having its input coupled to said master step wave generator and its output coupled to said substep wave generators, said counter being operative after a certain number of cycles of said master step voltage wave for simultaneously terminating the output waves from said substep wave generators, the number of risers in the step voltage waves produced by said substep wave generators being the same and equal to the number of cycles of said master step voltage wave counted by said counter.

5. A pulse time division multiplex system comprising a generator producing a master step voltage wave having a predetermined number of risers, a plurality of substep voltage wave generators corresponding in number to the number of risers in said master step voltage wave, each controlled by a different riser in the master step voltage wave, a plurality of groups of pulse producing and modulating units, means controlling different groups of units from the output waves of said substep voltage wave generators, each substep wave generator controlling a single group of said units, a counter having its input coupled to said master step wave generator and its output coupled to said substep wave generators, said counter being operative after a certain number of cycles of said master step voltage wave for simultaneously terminating the output waves from said substep wave generators.

6. A pulse time division multiplex system comprising a generator producing a master step voltage wave having a predetermined number of risers, a plurality of substep voltage wave generators each controlled by a different riser in the master step voltage wave, a plurality of pulse producing channel units, means controlling different groups of units from the output waves from said substep voltage wave generators, said channel units producing unidirectional amplitude modulated pulses, each substep wave generator controlling a single group of said units, the channel units in each group being differently biased to produce pulses on different risers in the step voltage wave produced by its associated substep voltage wave generator, a counter having its input coupled to said master step wave generator and its output coupled to said substep voltage wave generators and operative after a certain number of cycles of said master step voltage wave for simultaneously terminating the output waves from said substep voltage wave generators, a common load, and a converter circuit located between said groups of channel units and said load for converting said unidirectional amplitude modulated pulses to bi-directional amplitude modulated pulses.

7. A pulse multiplex system comprising a master step voltage wave generator producing a step voltage wave having a plurality of risers, a plurality of substep voltage wave generators each controlled by a different riser in the master step voltage wave, each substep wave generator producing two output waveforms one of which is a step voltage wave and the other of which is a short duration pulse of predetermined polarity, a plurality of groups of pulse producing channel units, means controlling different groups of units from the output step waves from said substep voltage wave generators, the channel units in each group being differently biased to produce pulses on different risers in the step voltage wave produced by its associated substep voltage wave generator, said channel units producing unidirectional amplitude modulated pulses, a counter coupled to said master step wave generator and to said substep wave generators and effective after a certain number of cycles of said master step voltage for simultaneously terminating the output step voltage waves from said substep wave generators, a synchronizing pulse generator under control of said counter and operative following the termination of the output step voltage waves from said substep wave generators, a common amplifier, a connection from the output of said synchronizing pulse generator to said amplifier, a converter circuit located between said groups of channel units and said common amplifier for converting said unidirectional amplitude modulated pulses to bi-directional amplitude modulated pulses whose direction or polarity depends upon the polarity of the modulating signal applied to the channel unit, and a connection between each substep voltage wave generator and said converter unit for supplying to said converter unit the short duration output pulse of predetermined polarity produced by that substep voltage wave generator.

8. A system in accordance with claim 7, wherein the channel units produce amplitude modulated pulses of negative polarity, the converter circuit produces both positive and negative amplitude modulated pulses, and each substep voltage wave generator produces short duration positive polarity pulses on one of its output terminals for application to said converter circuit.

9. In a pulse multiplex system wherein there is transmitted energy which is representative of a plurality of modulated pulses emanating from different channels and at least one synchronizing pulse for every frame or synchronizing period, a receiving terminal having means for reproducing pulses from the received energy, a synchronizing pulse separator circuit for separating the synchronizing pulse from the channel pulses, a master step voltage wave generator under control of the separated synchronizing pulse, a plurality of substep voltage wave generators each controlled by a different riser in the master step voltage wave, a plurality of groups of channel units, means coupling different groups of units to different substep voltage wave generators, to thereby control said groups from the output waves from said substep voltage wave generators, each substep wave generator controlling a single group of said channel units, and means for supplying said reproduced pulses to the channel units of all groups.

10. In a pulse multiplex system wherein there is transmitted energy which is representative of a plurality of modulated pulses emanating from different channels and at least one synchronizing pulse for every frame or synchronizing period, a receiving terminal having means for reproducing pulses from the received energy, a synchronizing pulse separator circuit for separating the synchronizing pulse from the channel pulses, a master step voltage wave generator under control of the separated synchronizing pulse, a plurality of substep voltage wave generators each controlled by a different riser in the master step voltage wave, a plurality of groups of channel units, means coupling different groups of units to different substep voltage wave generators, to thereby control said groups from the output waves from said substep voltage wave generators, each sub-step wave generator controlling a single group of said channel units, means utilizing said separated synchronizing pulse for simultaneously terminating the output waves from said substep wave generators, and means for supplying said reproduced pulses to the channel units of all groups.

11. In a pulse multiplex system wherein there is transmitted energy which is representative of a plurality of modulated pulses emanating from different channels and at least one synchronizing pulse for every frame or synchronizing period, a receiving terminal having means for reproducing pulses from the received energy, a synchronizing pulse separator circuit for separating the synchronizing pulse from the channel pulses, a master step voltage wave generator under control of the separated synchronizing pulse, a plurality of substep voltage wave generators each controlled by a different riser in the master step voltage wave, different groups of channel units under control of the output waves from said substep voltage wave generators, each substep wave generator controlling a single group of said channel units, the channel units in each group being differently biased to become effective on different risers in the step voltage wave produced by its associated substep voltage wave generator, connections from said synchronizing pulse separator circuit to said substep wave generators and to said master step wave generator for simultaneously terminating the output waves from said substep wave generators and for properly phasing said master step wave generator, and means for supplying said reproduced pulses to the channel units of all groups.

12. A pulse time division multiplex system comprising a master step voltage wave generator, a plurality of substep voltage wave generators each controlled by a different riser in the master step voltage wave, different groups of channel units coupled to and under control of said substep wave generators, each substep wave generator controlling a single group of said channel units, the channel units in each group being differently biased to become effective on different risers in the substep voltage wave produced by its associated substep voltage wave generator, and means properly phased with respect to said master step wave generator for simultaneously terminating the output waves from said substep wave generators.

13. A pulse multiplex system comprising a transmitter station including a generator producing a master step voltage wave having a predetermined number of risers, a plurality of substep voltage wave generators each controlled by a different riser in the master step voltage wave, different groups of pulse producing and modulating units under control of the output waves from said substep voltage wave generators, each substep wave generator controlling a single group of said units, a counter coupled to said master step wave generator and to said substep wave generators and operative after a certain number of cycles of said master step voltage wave for simultaneously terminating the output waves from said substep wave generators, a synchronizing pulse generator under control of said counter and operative following the termination of the output waves from said substep wave generators, and a common output circuit for the pulses produced by said units and for the pulses produced by said synchronizing pulse generator, and a remotely located receiving station having means for reproducing pulses from the received energy, a synchronizing pulse separator circuit for separating the synchronizing pulse from the channel pulses, a master step voltage wave generator under control of the separated synchronizing pulse, a plurality of substep voltage wave generators each controlled by a different riser in the master step voltage wave, different groups of channel units under control of the output waves from said substep voltage wave generators, each substep wave generator controlling a single group of said channel units, and means for supplying said reproduced pulses to the channel units of all groups.

14. In a pulse time division multiplex system wherein there is transmitted energy which is representative of a plurality of time displaced modulated pulses from different channel circuits, and step wave voltages are supplied to said channel circuits, each channel circuit including a pulse generating and modulating system comprising the following: a first electron discharge device electrode structure normally biased to cut-off and having an input electrode adapted to be supplied with a step voltage wave, the value of said bias being such that said structure becomes conductive on a particular riser of the applied step voltage wave, said first electrode structure also having an output electrode; a second electron discharge device electrode structure having an input electrode, an output electrode and a cathode, a resistor in circuit with said cathode, a series circuit of a rectifier and a coil connected between said cathode resistor and a source of D. C. potential, the rectifier being so poled that current flows through said series circuit and said cathode resistor to thereby develop a voltage across said cathode resistor of a magnitude sufficient to cut-off the flow of current through said second structure, a condenser between the output electrode of said first structure and the junction point of said rectifier and coil in said series circuit, said condenser and coil forming a series tuned circuit, a circuit coupled to the input electrode of said second structure for applying modulating potentials thereto; and an output circuit for said second structure.

15. In a pulse time division multiplex system wherein there is transmitted energy which is representative of a plurality of time displaced modulated pulses from different channel circuits, and step wave voltages are supplied to said channel circuits, each channel circuit including a pulse generating and modulating system comprising the following: a first electron discharge device electrode structure normally biased to cut-off and adapted to be supplied with a step voltage wave, the value of said bias being such that said structure becomes conductive on a particular riser of the applied step voltage wave, said first electrode structure also having an output electrode; a second electron discharge device electrode structure having an input electrode, an output electrode and a cathode, a resistor in circuit with said cathode, a series circuit of a rectifier and a coil connected between said cathode resistor and a source of D. C. potential, the rectifier being so poled that current flows through said series circuit and said cathode resistor to thereby develop a voltage across said cathode resistor of a magnitude sufficient to cut-off the flow of current through said second structure, a condenser between the output electrode of said first structure and the junction point of said rectifier and coil in said series circuit, said condenser and coil forming a series tuned circuit, a circuit coupled to the input electrode of said second structure for applying modulating potentials thereto; and an output circuit for said second structure, said output circuit including a low pass filter followed by an amplifier.

16. In a pulse time division multiplex system wherein there is transmitted energy which is representative of a plurality of time displaced modulated pulses from different channel circuits, and step wave voltages are supplied to said channel circuits, each channel circuit including a pulse generating and modulating system comprising the following: a first electron discharge device electrode structure normally biased to cut-off and adapted to be supplied with a step voltage wave, the value of said bias being such that said structure becomes conductive on a particular riser of the applied step voltage wave, said first electrode structure also having an output electrode; a second electron discharge device electrode structure having an input electrode, an output electrode and a cathode, a resistor in circuit with said cathode, a series circuit of a rectifier and a coil connected between said cathode resistor and a source of D. C. potential, the rectifier being so poled that current flows through said series circuit and said cathode resistor to thereby develop a voltage across said cathode resistor of a magnitude sufficient to cut-off the flow of current through said second structure, a condenser between the output electrode of said first structure and the junction point of said rectifier and coil in said series circuit, said condenser and coil forming a series tuned circuit, a circuit coupled to the input electrode of said second structure for applying modulating potentials thereto; and a common load resistor in common to the outputs of the second electron discharge device structures of said channel circuits.

17. In a pulse time division multiplex system wherein there is transmitted energy which is representative of a plurality of time displaced modulated pulses from different channel circuits, and step wave voltages are supplied to said channel circuits, each channel circuit including a pulse generating and modulating system comprising the following: a first electron discharge device electrode structure normally biased to cut-off and adapted to be supplied with a step voltage wave, the value of said bias being such that said structure becomes conductive on a particular riser of the applied step voltage wave, said first electrode structure also having an output electrode; a second electron discharge device electrode structure having an input electrode, an output electrode and a cathode, a resistor in circuit with said cathode, a series circuit of a rectifier and a coil connected between said cathode resistor and a source of D. C. potential, the rectifier being so poled that current flows through said series circuit and said cathode resistor to thereby develop a voltage across said cathode resistor of a magnitude sufficient to cut-off the flow of current through said second structure, a condenser between the output electrode of said first structure and the junction point of said rectifier and coil in said series circuit, said condenser and coil forming a series tuned circuit, means for applying received modulated pulses to the input electrode of said second electrode structure, said second structure being rendered conductive at a time determined by the flow of current through said first structure registering with the time of occurrence of a particular received pulse in each cycle of operations.

18. In a pulse time division multiplex system wherein there is transmitted energy which is representative of a plurality of time displaced modulated pulses from different channel circuits, and step wave voltages are supplied to said channel circuits, each channel circuit including a pulse generating and modulating system comprising the following: a first electron discharge device electrode structure normally biased to cut-off and adapted to be supplied with a step voltage wave, the value of said bias being such that said structure becomes conductive on a particular riser of the applied step voltage wave, said first electrode structure also having an output electrode; a second electron discharge device electrode structure having an input electrode, an output electrode and a cathode, a resistor in circuit with said cathode, a series circuit of a rectifier and a coil connected between said cathode resistor and a source of D. C. potential, the rectifier being so poled that current flows through said series circuit and said cathode resistor to thereby develop a voltage across said cathode resistor of a magnitude sufficient to cut-off the flow of current through said second structure, a condenser between the output electrode of said first structure and the junction point of said rectifier and coil in said series circuit, said condenser and coil forming a series tuned circuit, a circuit coupled to the input electrode of said second structure for applying modulating potentials thereto; and an output circuit for said second structure, said output circuit including a low pass filter, said modulating potentials being applied to the second electron discharge device structure at a time determined by the flow of current through said first structure registering with the time of occurrence of a particular received pulse in each cycle of operations, said filter offering low attenuation to the desired modulation frequency components and high attenuation for the pulse frequency components.

19. In combination, first and second step voltage wave generators, means coupling both of said step wave generators together for controlling the operation of said second step wave generator from the first step wave generator, and communication circuits coupled to the output of the second step wave generator and differently biased to become effective at different risers in the step voltage waves produced by said second step wave generator.

20. In combination, a pair of generators of step voltage waves, means for deriving from one of said generators a pulse at the end of each step voltage wave, means for applying said pulse to said other generator to control the operation thereof, and utilization circuits coupled to the output of said other step voltage wave generator and differently biased to become effective at different risers in the step voltage waves produced by said other generator.

21. In combination, a pair of generators of step voltage waves, means for deriving from one of said generators a pulse at the end of each step voltage wave, means for applying said pulse to said other generator to control the operation thereof, and utilization circuits coupled to the output of said other step voltage wave generator and differently biased to become effective at different risers in the step voltage waves produced by said other generator, each of said utilization circuits including means for producing pulses and for modulating a characteristic thereof in accordance with a signal to be transmitted.

WILLIAM D. HOUGHTON.

REFERENCES CITED

The following references are of record in the file of this patent:

UNITED STATES PATENTS

| Number | Name | Date |
|---|---|---|
| 2,048,081 | Riggs | July 21, 1936 |
| 2,265,216 | Wolf | Dec. 6, 1941 |
| 2,413,440 | Farrington | Dec. 31, 1946 |
| 2,415,567 | Schoenfeld | Feb. 11, 1947 |
| 2,429,631 | Labin | Oct. 28, 1947 |
| 2,468,059 | Greig | Apr. 26, 1949 |
| 2,480,137 | Houghton | Aug. 30, 1949 |